(12) United States Patent
Dillon

(10) Patent No.: US 7,719,777 B2
(45) Date of Patent: *May 18, 2010

(54) UNIFORM DIFFUSE OMNI-DIRECTIONAL REFLECTING LENS

(76) Inventor: Stephen M. Dillon, 8009 E. Dillon's Way, Scottsdale, AZ (US) 85260-1809

( * ) Notice: Subject to any disclaimer, the term of this patent is extended or adjusted under 35 U.S.C. 154(b) by 0 days.

This patent is subject to a terminal disclaimer.

(21) Appl. No.: 12/288,252

(22) Filed: Oct. 17, 2008

(65) Prior Publication Data

US 2009/0086154 A1      Apr. 2, 2009

(51) Int. Cl.
*G02B 13/20* (2006.01)
(52) U.S. Cl. .................. 359/707; 359/601; 359/726
(58) Field of Classification Search ........... 351/159, 351/160 R, 163, 165; 359/601–603, 642, 359/707, 726
See application file for complete search history.

(56) References Cited

U.S. PATENT DOCUMENTS

| | | | | |
|---|---|---|---|---|
| 4,934,792 A | * | 6/1990 | Tovi | 359/896 |
| 6,535,337 B1 | * | 3/2003 | Tanaka et al. | 359/599 |
| 7,443,608 B2 | * | 10/2008 | Dillon | 359/707 |

\* cited by examiner

*Primary Examiner*—Darryl J Collins
(74) *Attorney, Agent, or Firm*—William E. Hein

(57) ABSTRACT

A transparent multi-layer lens construction to be worn as a sunglass lens, or a fashion lens, that reflects light in a diffuse manner. The multi-layer lens construction is, in part, a combination of surface form and surface texture combined with a reflective medium and an anti-reflective coating. The present invention offers vast improvements over previously disclosed lens constructions in that it provides for both improved reflectivity and improved optical quality.

25 Claims, 18 Drawing Sheets

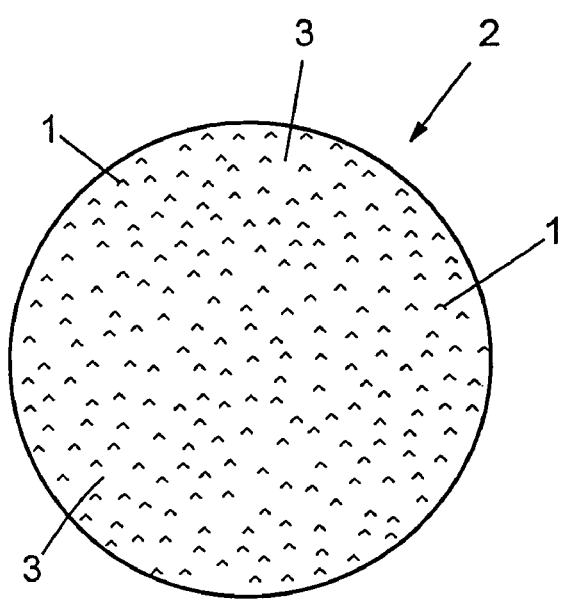
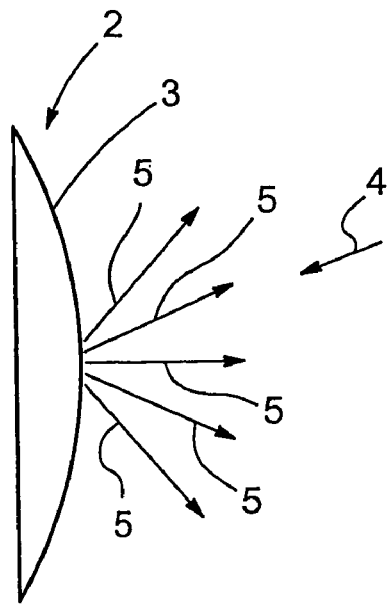
Fig. 3A    Fig. 3B
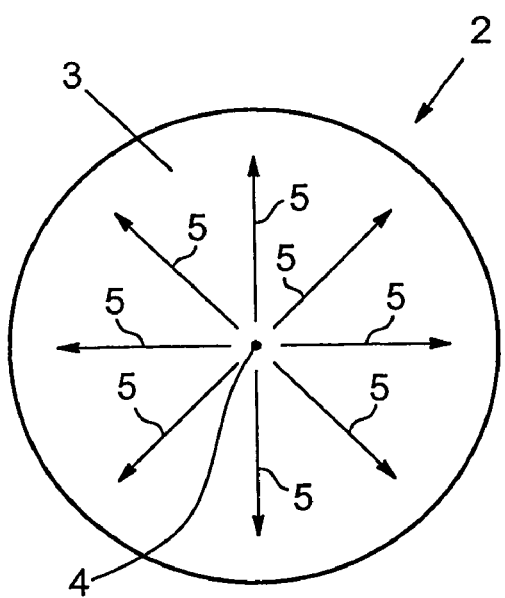
Fig. 3C

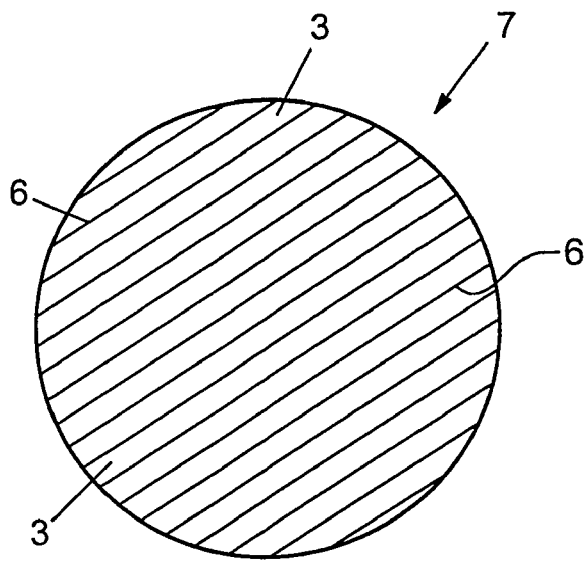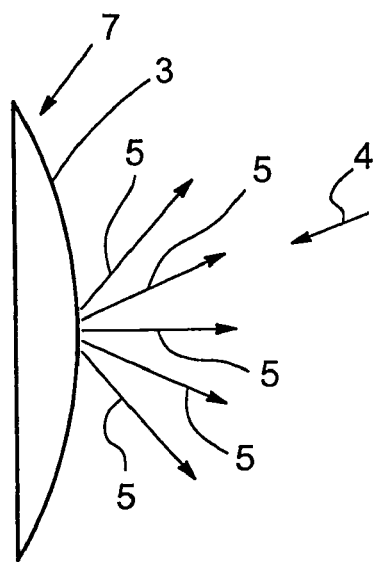
Fig. 4A    Fig. 4B
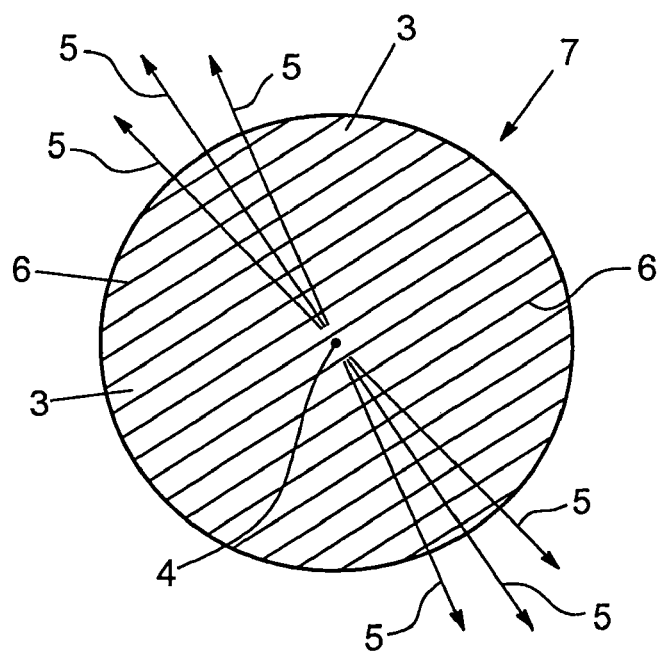
Fig. 4C

US 7,719,777 B2

UNIFORM DIFFUSE OMNI-DIRECTIONAL REFLECTING LENS

REFERENCE TO RELATED APPLICATION

This application claims priority benefit under 35 U.S.C. 120 and incorporates by reference the subject matter of allowed U.S. patent application Ser. No. 11/500,098 filed on Aug. 7, 2006 now U.S. Pat. No. 7,443,608.

BACKGROUND OF THE INVENTION

For a sunglass or sunglass lens to be successful in the high-end sunglass marketplace the product must have good optics and good aesthetics. In the last twenty years sunglass designs, in terms of optics and frames, have advanced significantly. The marketplace is highly competitive and it is very difficult for a new product, using existing methods, designs and know how, to stand out from the rest. The designs and technologies used in the manufacture of sunglasses have been highly perfected and standardized. And, as a result, sunglass types that are successful all share those same basic designs and technologies and, as a result, look substantially alike.

Virtually all sunglass lenses produce a pronounced specular reflection in that they reflect images of their environmental surroundings corresponding to the light that is impinging on the lens, similar to the way light reflects off a windowpane. Specular reflection is the type of reflection seen by a person when looking into a windowpane or a mirror. The described reflection is an inherent byproduct of a typical untreated surface that is optically smooth. When a highly reflective coating, such as a mirror coating, is applied to the surface of an optical lens it simply accentuates the reflective nature of that lens. One of the desirable functions of a sunglass lens among many consumers is that it conceal the wearer's eyes from an observer's point of view. In the case of a lens that does not have a mirror coating, it is dark tint in combination with the natural reflection off the surface of the lens that conceals the eyes of the wearer. Except in the case where a sunglass lens incorporates an encapsulated specular reflecting mirror coating, anti-reflective coatings are seldom placed on the front side of a sunglass lens. This is because it would be much easier for an observer to see through the lens to the eyes of the wearer. In the case of sunglass lenses, anti-reflective coatings are usually only employed on the backside of the lens adjacent the wearer's eyes, in which case the anti-reflective coating serves only to enhance the optics and does nothing to detract or enhance the aesthetic appearance of the lens from an observer's point of view. By placing the anti-reflective coating on the backside only, the reflection off the front of the lens is preserved. For conventional sunglass lenses, specular reflection is normally central to the design objective of the lens. For a sunglass consumer, the fashion choice among lenses is generally limited to lenses that reflect images of their surroundings, minimally or significantly, depending on whether or not they are mirror coated.

Past inventors have attempted to design a lens that departs from what is commonly expected in a sunglass lens by creating a lens that reflects light in a manner that features images of objects, faces, logos, letters or words. These attempts have incorporated reflective coated holographic diffraction patterns, also known as holograms, bas-reliefs, and surface etchings, such as photographic etchings, in a lens construction. Images that have been described in the prior art include faces of people, skulls, worms, eyeballs, and other types of inanimate objects such as monetary coins and nails, as well as logos. Holograms are used to create predetermined light wave interference patterns in reflected light to form the appearance of a desired image. Bas-reliefs and photo etchings are used to create varying shades of light and dark areas in predetermined patterns of reflected light to create a desired image. Other prior art described the use of alternating transparent colors to create the appearance of decorative patterns, such as a star pattern, in reflected light.

U.S. Pat. No. 4,315,665 first formulated the idea of creating a sunglass lens that features decorative images of objects and light patterns in reflected light by encapsulating a reflective coated light diffraction pattern, also known as a hologram, between two optically clear layers. Light diffraction patterns in particular are problematic in that they cause substantial internal reflections. There have been numerous later attempts to create a marketable sunglass type lens that reflects images of objects, faces, and/or logos. U.S. Pat. Nos. 4,934,792 and 5,073,009 describe similar lens constructions employing reflective coated bas-reliefs and photographic etchings to feature images of objects and pictures in reflected light, such as a silver dollar coin or a photographic image. U.S. Pat. No. 6,793,339 describes an etching process to create the appearance of a decorative logo, in combination with specular reflection to create a glossy appearance. Without exception, these prior art examples describe lens constructions that reflect images of objects, faces, logos or words as well as reflect images of environmental surroundings due to specular reflection.

U.S. Pat. Nos. 6,231,183 and 6,719,928, authored by the present inventor, describe a lens that reflects light but reflects almost no image. In this prior art the vast majority of the light being reflected by the lens came from an encapsulated reflective coating contoured by either a brushed surface finish or a matte surface finish. The described surface finish was used to break up reflected light so the reflective coating would not produce a specular reflection that would otherwise be apparent to an observer. Additionally, anti-reflective coatings were applied, primarily to the front surface of the lens. The anti-reflective coatings were employed to remove or substantially reduce the specular reflection coming off of the front lens surface, which would otherwise negate the effect of the matte or brushed finish and the lens construction as a whole. Without the inclusion of the anti-reflective coating, the lens construction would still produce reflections in the form of images because, in addition to light being reflected off the encapsulated reflective coating, a high percentage of light would also be reflected off the optically smooth outer surface of the lens, thus producing a specular reflection similar to that of a window pane or conventional sunglass lens. In most natural lighting conditions, the specular reflection coming from the optically smooth surface would also partially conceal the reflection produced by the reflective coating. This prior art recognized the inherent difficulty of matching refractive indices associated with lens constructions of earlier prior art. In response to these shortcomings, the referenced prior art of the present inventor described a lens construction that incorporated a textured finish with a reflective medium applied thereon encapsulated within a lens construction that guaranteed matched refractive indices in the critical area of the lens construction. It has since been discovered that perfectly matching the refractive indices do not in itself eliminate all of the problems associated with such a lens construction as a whole. The matte finish of the prior art was created as a dull finish having little to no contrast in reflected light. The matte finish was found to have significant limitations in terms of achieving both good optics and good reflective characteristics. The problem with a matte finish is that it diffuses reflected light too much. The term contrast is meant to describe the appearance of light reflected off a surface. If a bright light impinges on a spherical surface having an optically smooth surface finish, a distinct reflection of the incident light reflecting off the surface will appear at a single point on the spherical surface. This is because an optically smooth surface exhibits high contrast. If a similar spherical surface having a surface finish with little or no contrast, such as a matte finish, is highlighted with the same bright light, a large portion of the surface area will be illuminated simultaneously. This is because a matte finish exhibits low contrast. On a matte finish, the contrast is low because reflected light is scattered to a high degree and, because the reflected light is scattered to a high degree, the brightness of the reflection is reduced. It has been found that a surface finish having exceedingly low contrast does not produce a bright enough reflection when encapsulated within a lens construction. As described, the present inventors prior art lens was designed so that the majority of the reflected light comes from the encapsulated reflective medium within the lens. Therefore, if the reflection produced by the reflective medium is not bright enough, light is more easily transmitted from the wearer's side of the lens to an observer's side of the lens. Thus, the majority of the reflection produced by the reflective medium is canceled out, making it easier for an observer to see through the lens to the eyes of the wearer. In an effort to increase its reflectivity, increased amounts of a reflective medium, such as chromium, were applied to the matte finish. In doing so it became evident that there is a limit as to how much reflective medium should be applied to a lens construction, beyond which the optical performance of the lens is degraded. When using metallic reflective mediums, such as chromium or aluminum, increasing the amount of the reflective medium produces a brighter reflection but correspondingly reduces the amount of light capable of being transmitted. In addition to the reflective medium, there is also a light-absorbing element in the form of tint or a polarized film positioned between the reflective medium and the eye of the wearer. In addition to absorbing the bright light of the sun, the light-absorbing element serves to absorb light being reflected off of the reflective medium back toward the eye of the wearer (back reflection). The use of more reflective medium increases the brightness of the resulting reflection, thus requiring a darker tint to attenuate the back reflection. The result of using too much reflective medium is that the lens becomes too dark, which reduces its ability to transmit light. A properly constructed lens of this type requires a balance between the light transmittance level of the reflective medium and the light transmittance level of the light-absorbing element. This is so that the final lens construction will transmit an acceptable amount of light as outlined by the appropriate American National Standards Institute (ANSI) standards for sunglass lenses. If the only objective is to create a surface that reflects bright enough, then an unlimited amount of reflective medium could be applied to the surface finish. When operating within the constraints of an optical lens, however, there are limits as to what can be achieved with a given design such as the matte finish. In this case it proved difficult to achieve an acceptable amount of brightness in reflected light while maintaining a sufficient amount of light transmission.

As described, the anti-reflective coating does significantly reduce the reflection off the front surface of the lens of the prior art. However, anti-reflective coatings produce specular reflections of their own. For example, different types of anti-reflective coatings reflect in different colors, such as blue, green or red. The main purpose of nearly all anti-reflective coatings is to substantially eliminate white light reflection. If an anti-reflective coating is applied to a common dark lens, the result is that there will be a slight colored mirror effect, whether it be blue/purple, green or red. This is a common effect that can be seen on the backside of conventional sunglass lenses to which an anti-reflective coating has been applied. If an anti-reflective coating is applied to a clear uncolored lens, such as a lens used in a reading glass, the colored reflection is less obvious because light is easily transmitted from the wearer's side of the lens to the observer's side of the lens, thus washing out the specular reflection of the anti-reflective coating. In the case of a matte finish lens, in which the reflection is highly diffused, the specular reflection of the anti-reflective coating is readily apparent in incident light, which detracts from the desired effect of the lens. The only way to overcome and effectively compensate for the inherent reflection of the anti-reflective coating is to increase the brightness of the reflective medium, which, as previously described, caused difficulties in terms of reduced light transmission and increased back reflection.

The brushed finish was to found to be very problematic but for different reasons. While the brushed finish reflects brightly, it exhibits a more serious problem of internal reflection. The brushed finish incorporated in the lens construction of the prior art is defined by scratch lines or grooves that are generally linear and generally parallel to one another. The brushed finish reflects light in a bi-directional manner, meaning that it reflects light predominantly in two directions perpendicular to the grooved or scratch lines defining the brushed finish. This lens construction, as worn in an eyewear frame, produces a very sharp reflection within the lens viewable by the wearer whenever facing a bright light source such as the sun. The reflections can be so pronounced that one needs only to be facing in the general direction of the sun to have a spire like reflection, corresponding to the bi-directional reflective appearance of the lens, come into view. The appearance from a wearer's point of view is similar to that of an oily smear on the surface of a lens when viewed in direct light. Many variations were tested with practically no success in overcoming the internal reflections attributed to the brushed finish. It was found that the more parallel the scratches, or grooves, defining the brushed finish were, the more intense and pronounced the internal reflection. In an effort to reverse the problem, the scratch lines, or grooves, defining the brushed finish were made to be more divergent, or less parallel, by crisscrossing them in varying degrees. The more divergent the brushed lines were made to be the wider the reflection fanned out from the point where incident light strikes the surface of the lens as viewed from an observer's point of view. Correspondingly, the internal reflection affected a greater surface area of the lens, as viewed from a wearer's point of view. Different types of reflective mediums as well as improved anti-reflective coatings were tried. In all cases internal reflections remained, though in varying degrees, none of which proved satisfactory. Essentially, it was found that a lens construction having a bi-directional reflecting brushed finish highlighted by a reflective medium encapsulated within a lens construction inherently produces distracting internal reflections. The reflection, as viewed by an observer, generated by the brushed finish posed yet another problem. As previously stated, the brushed finish reflects brightly but because it reflects bi-directionally, when in bright light, unless properly positioned relative to the brushed finished lens and a given light source, a direct reflection from the reflective medium will not be apparent to an observer which in turn makes it more easy for an observer to see the eyes of the wearer. As with the matte finish lens of the prior art, the brushed finish lens was designed to cause the majority of the reflected light to come from the encapsulated reflective medium within the lens. Therefore, if the reflection produced by the reflective medium is unobserved or is not sufficiently bright, light is more easily transmitted from the wearer's side of the lens to the observers side of the lens, thus canceling any reflection produced by the reflective medium and making it easier for an observer to see through the lens to the eyes of the wearer. The resulting lens constructions of this prior art demonstrated that the brushed finish and the matte finish provided inherently poor optics in that they both exhibited poor reflective characteristics and, primarily in the case of the brushed finish, caused severe internal reflections. In order to increase the light transmission of the matte finish lens construction, the amount of reflective medium had to be reduced, which further reduced its reflective characteristics. In order to reduce the severity of the internal reflections of the brushed finish lens construction, the amount of reflective medium had to be reduced, thereby further reducing its reflective characteristics. The combination of optical performance and reflectivity must be properly balanced and that in order to do so and meet the design criteria set forth in the current invention a new type of reflecting surface must be provided for.

SUMMARY OF THE INVENTION

The present invention is referred to as a Uniform Diffuse Omni-directional Reflecting Lens, and is a multi-layer sunglass lens that reflects light in a diffuse manner. The Uniform Diffuse Omni-directional Reflecting Lens exhibits a soft contrast lustrous satin-like appearance from an observer's point of view that transmits light like a conventional sunglass lens. The Uniform Diffuse Omni-directional Reflecting Lens is distinguishable over the prior art in that it exhibits good reflective properties, does not cause distracting internal reflections, and reflects light in a diffuse manner. The Uniform Diffuse Omni-directional Reflecting Lens incorporates an anti-reflective coating or surface treatment in combination with a lens element having a reflecting surface hereinafter referred to as a Diffuse Reflecting Form Texture. The Diffuse Reflecting Form Texture reduces the amount of contrast that would normally appear in light reflected off an optically smooth or highly polished surface. A lens of the type disclosed herein is significant and advantageous in that it provides manufacturers and consumers a distinctly new and practical fashion lens option. It is further anticipated that the lens of the present invention can be used to create protective eyewear for military use, wherein dielectric reflective coatings can be used to provide protection from laser light. Specially designed dielectric reflective coatings are commonly used in eyewear for such military applications. These dielectric coatings are normally very bright in appearance. By employing these types of reflective coatings in accordance with the present invention, a lens having the same filtering capabilities can be created in which the resulting reflection is subdued by diffusing the brightness of the reflection. Such an effect is advantageous in that it reduces the observability of the resulting eyewear. The Uniform Diffuse Omni-directional Reflecting Lens may be manufactured as a curved lens, such as spherically curved, or a flat lens and may be mounted in a conventional type of eyewear system having two lenses or a unitary lens eyewear system having a single lens such as a unitary lens sunglass or a goggle.

BRIEF DESCRIPTION OF DRAWINGS

FIG. 3A is a front plan view of a stainless steel reflecting surface that simulates the reflective characteristics of the lens of FIG. 1.

FIG. 3B is a side view of the stainless steel reflecting surface of FIG. 3A illustrating how light reflects off that surface.

FIG. 3C is a front plan view of the stainless steel reflecting surface of FIG. 3A showing how light reflects off that surface.

FIG. 4A is a front plan view of another stainless steel reflecting surface that reflects light in a bi-directional manner.

FIG. 4B is a side view of the stainless steel reflecting surface of FIG. 4A illustrating how light reflects off that surface.

FIG. 4C is a front plan view of the stainless steel reflecting surface of FIG. 4A showing how light reflects off that surface.

DESCRIPTION OF PREFERRED EMBODIMENT

Figure 1:
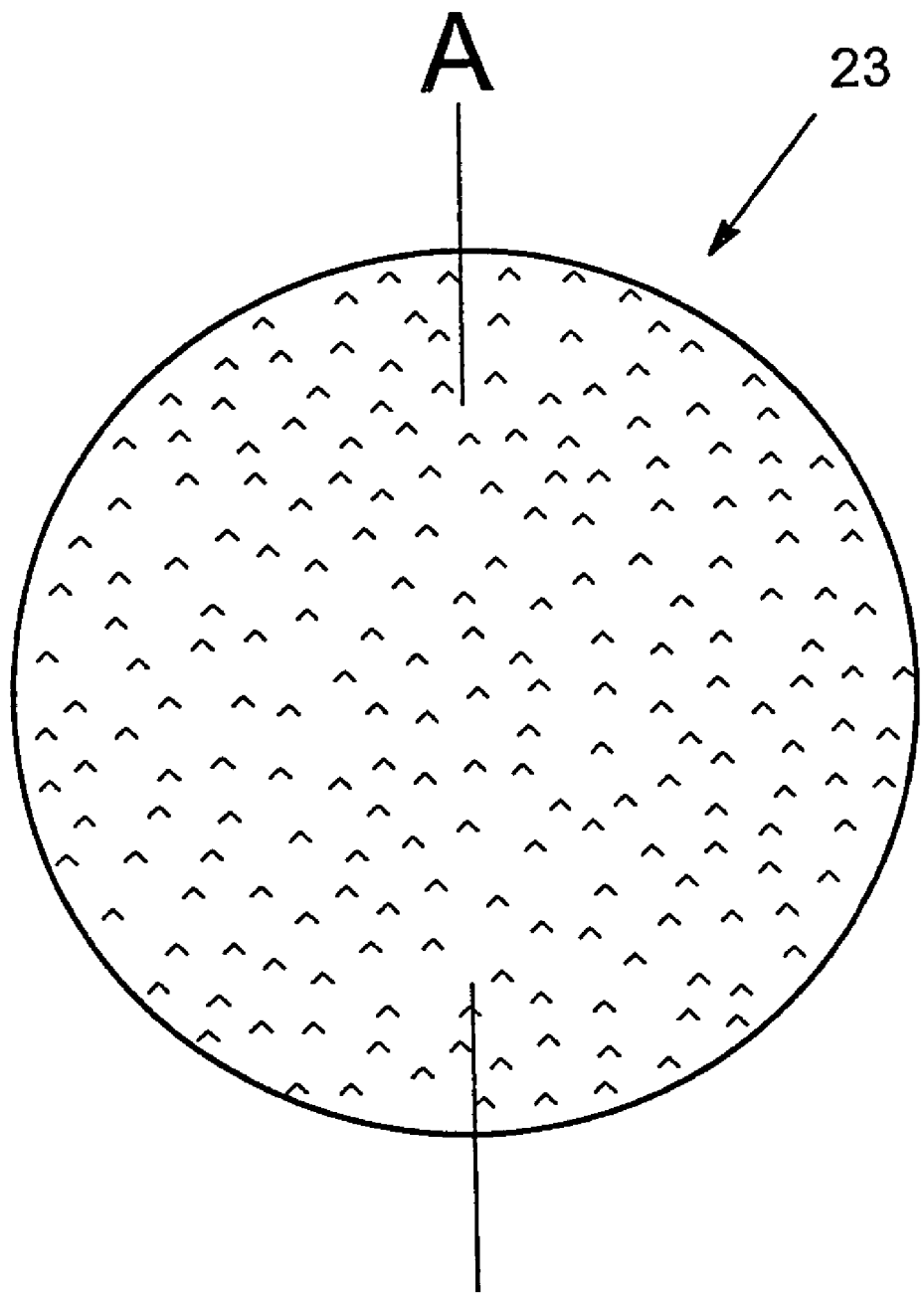
FIG. 1 is a front plan view of an uncut lens in accordance with the present invention.

The Uniform Diffuse Omni-directional Reflecting Lens of the present invention, hereinafter referred to as a Diffuse Reflecting Lens, is a multi-layer lens construction to be used in an eyewear system as a sunglass lens or a fashion lens that reflects light in a diffuse manner. The following is a discussion of the various ways in which the Diffuse Reflecting Lens may be constructed, manufactured, and installed in an eyewear system such as a dual-lens eyewear system or a unitary lens eyewear system. A dual-lens eyewear system has two lens locations into which two separate lenses may be installed. The two lens locations of a dual-lens eyewear system are arranged in a left and right orientation coincident with a wearer's normal line of sight for each eye. A unitary lens eyewear system uses a single lens commonly referred to as a unitary lens. A unitary lens is a single lens that extends through a wearer's normal line of sight for both eyes. Unitary lenses are commonly used in ski goggles, for example, and sunglasses. A unitary lens may also take the form of a visor, such as a flip down visor for a helmet. Most conventional lenses, such as those employed in either dual-lens eyewear systems or unitary lens eyewear systems, are manufactured as "oversize" lenses, that is, they are manufactured to be larger than the largest lens location in which they are anticipated to be installed to provide excess material that may be cut away, allowing the lens to be cut down and installed in eyewear systems of varying shapes and sizes. Like most conventional lenses, the various lens constructions of the Diffuse Reflecting Lens described herein may be, and preferably are, manufactured the same way for the same reason. A lens that is manufactured to be oversize and has not yet been cut down to a specific size and shape so that it can be installed in an eyewear system is widely referred to within the optical industry as an "uncut lens". An uncut Diffuse Reflecting Lens refers to a Diffuse Reflecting Lens that is manufactured to be oversize and has not been cut down to a specific size and shape so that it can be installed in an eyewear system. If desired, the Diffuse Reflecting Lens may be manufactured to a finished size and shape that will allow it to be mounted in a specific eyewear system, thus avoiding an additional cutting down process. Doing so, however, creates a degree of difficulty in that it may require a uniquely shaped mold system and is potentially limited to use in only a single eyewear system. The Diffuse Reflecting Lens can be manufactured as a curved lens, such as spherically curved, or as a flat lens that may, if desired, be subsequently curved. The Diffuse Reflecting Lens has a front surface that forms an outer surface and a back surface that forms another outer surface. The front surface of the Diffuse Reflecting Lens is the surface located on the front side of the Diffuse Reflecting Lens and the back surface is the surface located on the backside of the Diffuse Reflecting Lens. The front side and the associated front surface of the Diffuse Reflecting Lens are opposite the backside and the associated back surface of the Diffuse Reflecting Lens. As worn, the backside is the side of the Diffuse Reflecting Lens that is adjacent the eye of the wearer and the front side is the side of the Diffuse Reflecting Lens that is viewed by an observer. The Diffuse Reflecting Lens is, in part, composed of a first and second lens element laminated together with a reflective medium positioned between them in combination with an anti-reflective coating, or anti-reflective surface treatment, on the front side of the resulting lens construction. The first lens element includes a first surface. Prior to the lamination process, a reflective medium is applied to the first surface of the first lens element. The first surface of the first lens element, upon which the reflective medium is applied, is at least partially comprised of what is called a Diffuse Reflecting Form Texture. The Diffuse Reflecting Lens reflects light in a uniform diffuse omni-directional manner from the front side of the lens and transmits light like a conventional eyewear lens or sunglass lens to the eye of the wearer. Viewed from the front side, or in other words, from an observer's point of view, the Diffuse Reflecting Lens, in combination with an optically suitable amount of reflective medium, has an easily perceived soft contrast lustrous satin like appearance substantially void of specular reflection. The Diffuse Reflecting Form Texture in combination with the reflective medium produces the unique reflection of the Diffuse Reflecting Lens. The Diffuse Reflecting Form Texture is designed to have good reflective properties in that, with an optically suitable amount of reflective medium, it can produce an apparent diffuse reflection in a wide range of lighting conditions and viewing angles. Additionally, the Diffuse Reflecting Form Texture in combination with the reflective medium is designed to prevent distracting internal reflections within the lens and to reflect light in a diffuse manner. The Diffuse Reflecting Form Texture in combination with the reflective medium has a satin like appearance that reflects incident light impinging thereon in a uniform, diffuse and omni-directional manner. The reflection produced is lustrous but not mirror like. In other words, it is between a glossy and matte finish. The Diffuse Reflecting Form Texture represents a significant improvement over previous attempts to create a reflecting surface that does not reflect a coherent image in that it has good reflective properties and does not create distracting internal reflections within the lens.

The Diffuse Reflecting Form Texture is a combination of both surface form and surface finish wherein the surface finish is a textured finish applied to the surface form. The surface form of the Diffuse Reflecting Form Texture is featureless. A featureless surface form, as defined herein, is a surface form that is void of surface irregularities formed by changing, varying and alternating elevations that create light and dark areas in reflected light that would otherwise cause an apparent decorative feature to stand out on the surface. An example of changing, varying and alternating surface elevations that create light and dark areas in reflected light which in turn cause a decorative feature to stand out on the surface is an indented or raised portion of a surface, such as a bas-relief, that in turn creates a likeness of a persons face. The textured finish is composed of peaks and valleys that fall within specified parameters. The arrangement of the peaks and valleys of the textured finish is random and continuous about the surface area of the featureless surface form within the area occupied by the Diffuse Reflecting Form Texture. An example of peaks and valleys arranged in a random and continuous manner is the arrangement of abrasive particles about the surface area of a new sheet of common sandpaper, wherein the top of each abrasive particle represents a peak and the surface area between a given abrasive particle and an adjacent abrasive particle represents a valley. The peaks and valleys of the textured finish of the Diffuse Reflecting Form Texture and the described sandpaper are random in that each peak and each valley does not have a specific predetermined location relative to the surface upon which it is located. The peaks and valleys of the textured finish of the Diffuse Reflecting Form Texture and the described sandpaper are continuous in that each peak leads directly into an adjacent valley and each valley leads directly into an adjacent peak and as such forms a cyclical pattern that repeats itself through out the entire surface area occupied by the peaks and valleys.

Figure 2:
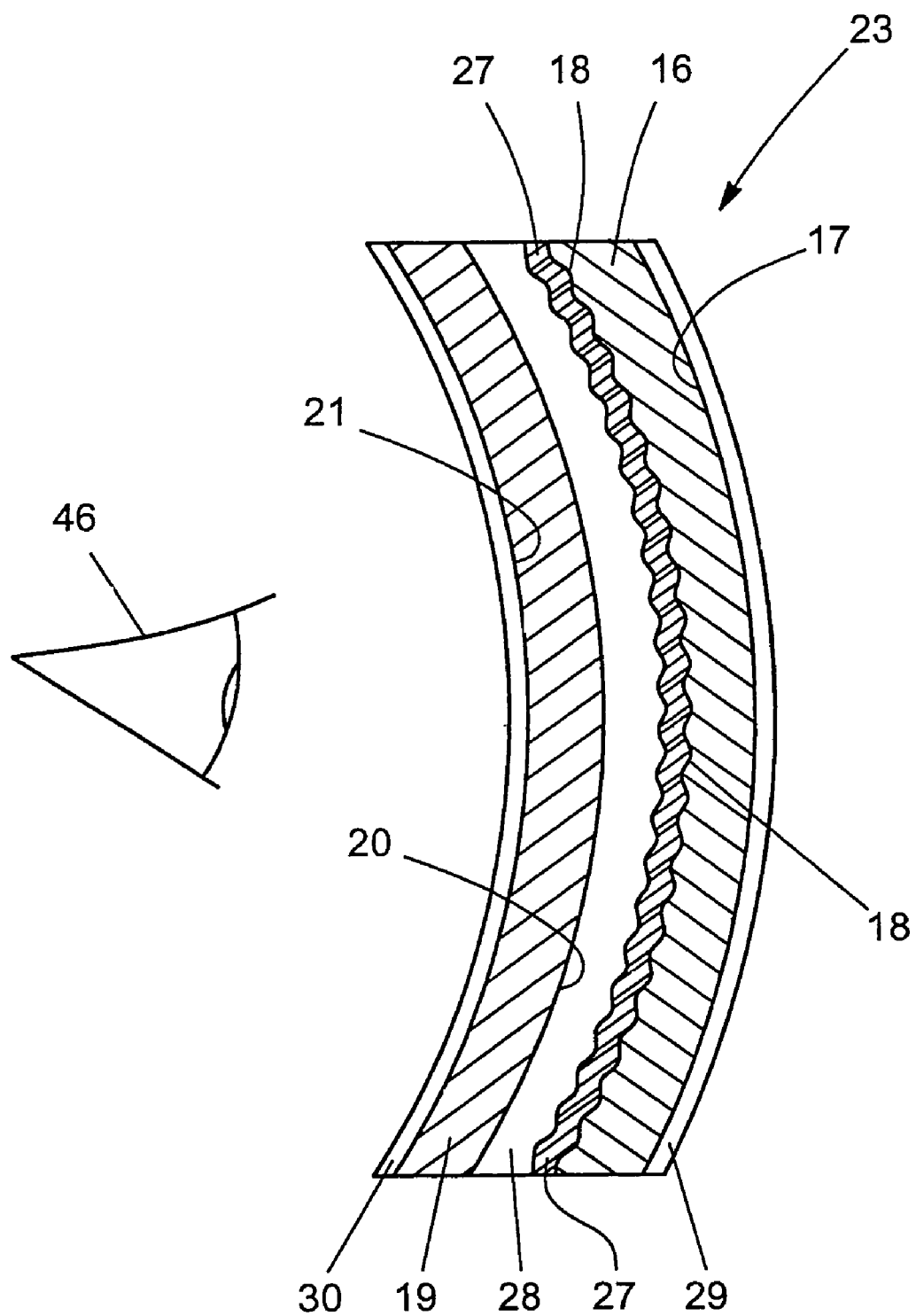
FIG. 2 is a cross-sectional diagram of the lens of FIG. 1 taken along section line A-A.

Referring now to FIG. 1, there is shown an uncut Diffuse Reflecting Lens 23 manufactured as a round lens that can be cut down and installed in a left or right lens location of a dual-lens eyewear system. The uncut Diffuse Reflecting Lens of FIG. 1 is shown from the front side. Referring now to FIG. 2, there is shown a section view of Diffuse Reflecting Lens 23 of FIG. 1 along section line A-A to illustrate individual lens elements. FIG. 2 depicts a first lens element 16, a reflective medium 27, an optical adhesive 28, a second lens element 19, and anti-reflective coatings 29, 30. Surface 18 represents the first surface of first lens element 16. The peaks and valleys that are depicted along surface 18 in FIG. 2 represent the peaks and valleys of the Diffuse Reflecting Form Texture. Reflective medium 27 is shown following the contour of the peaks and valleys. Surface 17 of first lens element 16 of FIG. 2 is an outer surface upon which anti-reflective coating 29 is shown applied, and surface 21 of second lens element 19 of FIG. 2 is an outer surface upon which anti-reflective coating 30 is shown applied. Eye 46 represents the eye of a wearer and serves to illustrate the side of the Diffuse Reflecting Lens of FIG. 2 that is the backside. Surface 21 depicts the back surface and is located on the backside of the Diffuse Reflecting Lens of FIG. 2 adjacent eye 46. Surface 21 of second lens element 19 of FIG. 2 is optically smooth and is shown as a concave surface. Surface 17 of first lens element 16 of FIG. 2 is optically smooth and is shown as a convex surface opposite surface 21. Surface 17 depicts the front surface and is located on the front side of the Diffuse Reflecting Lens of FIG. 2 and therefore, as worn, is on the side of the Diffuse Reflecting Lens of FIG. 2 that is viewed by an observer. First and second lens elements 16 and 19 are manufactured separately and as such form prefabricated solid-state lens elements prior to being bonded together. The first and second lens elements may be injection molded or cast using an optical grade plastic such as a thermoplastic or thermoset plastic material.

Reflective medium 27, which may be chromium, for example, is very thin, measuring generally only a few angstroms in thickness. The reflective medium reflects a fraction of the light impinging thereon and allows the remainder to pass through. Like the reflective medium, anti-reflective coatings 29, 30 of FIG. 2 are also very thin and are preferably applied using conventional vacuum-deposition methods. The anti-reflective coatings may be applied prior to or after the first and second lens elements are laminated together.

It is preferred that the surface of the second lens element in contact with the adhesive element, such as surface 20 of second lens element 19, be optically smooth. However, if the refractive index of adhesive 28 closely matches that of second lens element 19, surface 20 can have a surface that is not optically smooth. It is preferred that lens elements 16 and 19 have the same refractive index. Therefore, it is preferred that lens elements 16 and 19 be made of the same material.

If the Diffuse Reflecting Lens is to be manufactured as a plano lens, a lens without corrective power, it is preferred that the first and second lens elements be 1.0 to 1.5 millimeters thick for a total combined thickness of 2.0 to 3.0 millimeters. If desired, the Diffuse Reflecting Lens may be manufactured as a decentered lens or a corrective lens having power by simply altering the thickness and or the curve of the first or second lens element a desired amount. Also, if desired, the Diffuse Reflecting Lens may be manufactured as an extra thick semi finished lens construction that can be ground and polished for the purpose of creating a corrective lens.

The Diffuse Reflecting Form Texture reduces the amount of contrast that would normally appear in light reflected off an optically smooth or highly polished surface. For example, if a black and white checkerboard pattern is placed in front of a mirror, the reflection in the mirror will be that of the same checkerboard. The contrast between the black squares and the white squares is sharp allowing an observer to easily distinguish between the areas of black and white and thus to recognize the pattern. The reflection produced by a mirror is specular. If the reflecting surface becomes uneven in the manner described in the present invention, the contrast between black and white becomes fuzzy, reducing the observer's ability to recognize where black turns to white and thus making it more difficult to recognize the pattern. The more uneven the reflecting surface becomes, again along the lines of the surface described herein, the more the contrast is reduced. As contrast is further reduced, a point is reached at which there is little or no contrast as in the case of a matte finish. The reduction in contrast can also be described in terms of diffuse reflection. The more diffuse the reflected light, the less contrast an observer will perceive in the reflected light. Further, the more diffuse the reflected light is the less bright the reflection will be.

The Diffuse Reflecting Form Texture is designed to reflect light within a range of diffuseness that has been found to produce good reflectivity with a minimal use of reflective medium. Applying more reflective medium, such as chromium or aluminum, can increase the reflectivity of the Diffuse Reflecting Lens, however, doing so reduces the amount of light transmission and, as a result, limits the amount of reflective medium that can be used, beyond which the optical quality of the completed lens is negatively affected. In light of this restriction, the Diffuse Reflecting Form Texture is designed so that a sufficient amount of brightness and luster in reflected light can be achieved without exceeding the limitations imposed on the use of a reflective medium such as chromium or aluminum. For the Diffuse Reflecting Lens to work properly, it is important that the lens reflect light in a manner that is sufficiently bright. There are a number of reasons for this. It is important that the Diffuse Reflecting Form Texture, in combination with an optically suitable amount of reflective medium, be designed to be lustrous enough and bright enough so that an observer is not easily able see through the lens to the eyes of the wearer. If the reflected light is too diffuse, the brightness and the luster of the reflection may become too diminished, making it difficult to perceive a reflection and, when combined with the anti-reflective coating, making it easier for an observer to see the eyes of the wearer. It is also important that the completed lens has a readily apparent level of brightness and luster in reflected light so that the dim colored specular reflection of the anti-reflective coating is concealed. If the reflective medium produces a bright enough reflection, the weaker specular reflection produced by incident light striking the anti-reflective coating will be sufficiently backlit and washed out by the reflection coming from the reflective medium.

To further illustrate what is meant by uniform diffuse omni-directional reflection, FIGS. 3A-C and 4A-C depict two stainless steel discs that reflect light in two distinctly different manners. Stainless steel disc 2 of FIG. 3A-C has a surface in the form of the Diffuse Reflecting Form Texture and reflects light in a uniform diffuse omni-directional manner. Stainless steel disc 2 of FIGS. 3A and 3C is shown in plan view from the side that has the Diffuse Reflecting Form Texture. Upside down "V" symbols 1 of FIG. 3A represent the peaks and valleys of the textured finish of the Diffuse Reflecting Form Texture. For the purpose of simplification the upside down "V" symbols of FIG. 3A are not shown in FIG. 3C. The surface of stainless steel disc 2 that has the Diffuse Reflecting Form Texture is spherical in shape and, for illustrative purposes, has a spherical radius of greater than twenty-five millimeters. FIG. 3B depicts stainless steel disc 2 in profile view wherein surface 3 represents the spherical surface that has the Diffuse Reflecting Form Texture.

Stainless steel disc 7 of FIGS. 4A-C has a brushed finish surface. The brushed finish reflects light in a bi-directional manner. Stainless steel disc 7 of FIGS. 4A and 4C is shown in plan view from the side having the brushed finish. The surface of stainless steel disc 7 that has the brushed finish applied thereon is spherical in shape and, for illustrative purposes, has the same spherical radius as stainless steel disc 2 of FIGS. 3A-C. FIG. 4B depicts stainless steel disc 7 in profile view wherein surface 3 represents the spherical surface. The surface form of surface 3 of FIGS. 4A-C, upon which the brushed finish is applied, is featureless. The brushed finish is created by sand paper or an abrasive pad wherein the sand paper or abrasive pad creates a surface abrasion in the form of scratches that are generally linear and generally parallel to one another. Lines 6 of FIGS. 4A and 4C represent the scratches that make up the brushed finish of stainless steal disc 7.

FIGS. 3B and 3C illustrate the reflection created by the Diffuse Reflecting Form Texture. FIGS. 4B and 4C depict the bi-directional reflection created by the brushed finish. Arrow 4 of FIG. 3B represents an incident light ray striking surface 3 of stainless steel disc 2. Arrows 5 of FIG. 3B represent the light reflected from surface 3 of FIG. 3B. FIG. 3C illustrates incident light 4 and reflected light 5 of FIG. 3B in plan view. As can be seen in FIG. 3C, light rays 5 radiate approximately equally over three hundred sixty degrees. It is this type of reflection that is referred to as omni-directional reflection. The reflection is considered to be omni-directional because it radiates substantially symmetrically over three hundred sixty degrees from the point where incident light 4 of FIG. 3C strikes the surface of the Diffuse Reflecting Form Texture. Because the light is reflected in an omni-directional manner, it produces an apparent reflection under a wide range of lighting conditions and viewing angles. The reflection is considered to be uniform because incident light impinging on any given point about the Diffuse Reflecting Form Texture will be reflected in substantially the same omni-directional manner. In contrast to this type of reflection, FIGS. 4B and 4C depict how light rays reflect off the brushed finish. Light rays 5 are shown to reflect from surface 3 of FIG. 4C in a bi-directional manner perpendicular to scratch lines 6 depicted in FIGS. 4A and 4C. The bi-directional reflection produced by the brushed finish has been found to be unsuitable due to the significant internal reflections it produces when encapsulated in a lens construction as described by the referenced prior art. It should be noted that the described use of stainless steel in FIGS. 3A-C and 4A-C serves only as an example to illustrate the described reflections.

Unlike a light diffraction pattern grating used for creating holograms, the peaks and valleys of the textured finish of the Diffuse Reflecting Form Texture are random and not as critically defined. As compared to textured finishes in general, however, the textured finish incorporated in the Diffuse Reflecting Form Texture is rather narrowly defined. As previously stated, the Diffuse Reflecting Form Texture is designed to reflect light in a diffuse manner within a range of diffuseness. The physical nature of the peaks and valleys of the textured finish determine the degree of diffuseness. It has been found that from the standpoint of reflective characteristics and resulting optical performance there is an optimum range of diffuseness in reflected light. The peaks and valleys of the textured finish of the Diffuse Reflecting Form Texture are defined in terms of slope angle, roughness and peak density. Rdq (root mean square of mean slope) is a measurement that refers to slope angle wherein a slope is the surface portion that extends from a given valley to an adjacent peak. Rq (root mean square roughness) is a measurement that refers to roughness or surface height variations of the textured finish. RSm (mean spacing between profile peaks) is a measurement that refers to peak density. Rdq, Rq and RSm are standard measurements in the field of measuring surface roughness and physical characteristics. Essentially, the Rdq measurement is a weighted average of all the slope angles extending from the valleys to each valley's adjacent peak within a given measured line length or surface area of measurement. Similarly, Rq is a weighted average of surface roughness within a given measured line length or surface area of measurement. RSm measures the number of, what are called, profile peaks within a given line length or surface area of measurement.

As it relates to a highly reflective surface of the type described herein, the performance of the reflective surface in terms of diffuseness is largely determined by the Rdq value. For a given Rq value, shallower average slope angles result in lower Rdq values. Lower Rdq values result in reflections that are less diffuse and of higher contrast. Conversely, higher Rdq values result in reflections that are more diffuse and of decreased contrast. The individual slope angles, that is, a given slope connecting a particular valley to an adjacent peak, of the Diffuse Reflecting Form Texture are not necessarily entirely constant throughout and that is why the slope angle measurements are calculated as an average.

Figure 5:
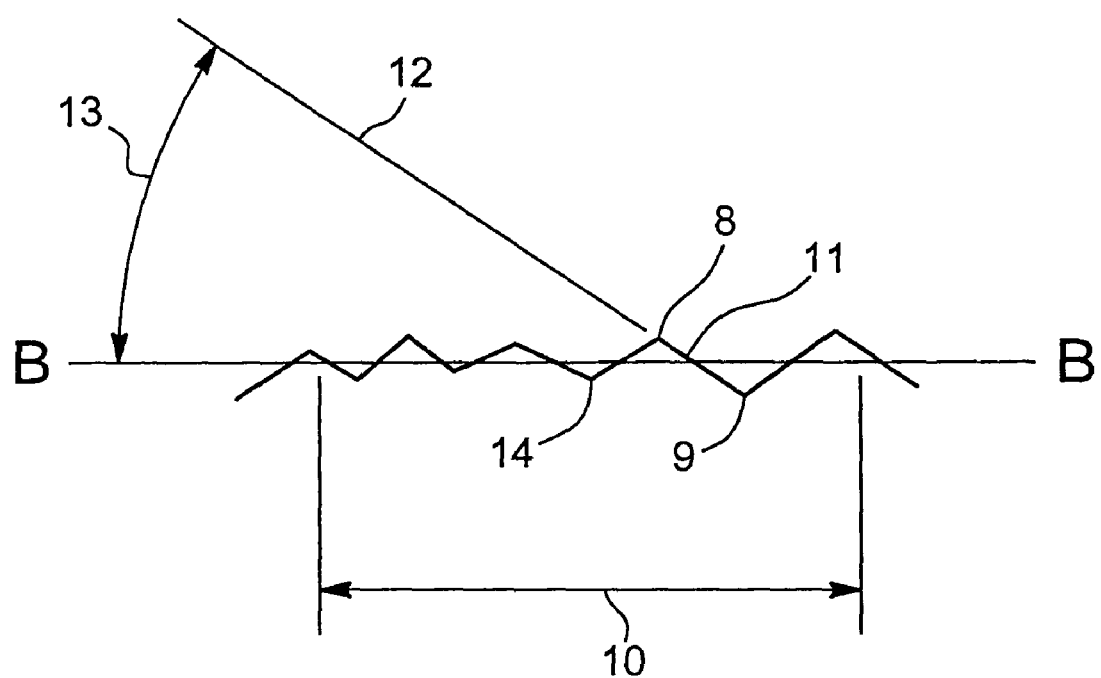
FIG. 5 is a cross-sectional instructional diagram of a textured surface illustrating the measurement of surface features.

The Rq measurement relates to the average distance, in terms of depth, measured from the bottom of the valleys to the tops of the peaks, or in other words, the amplitude. Lower Rq values mean a shallower average depth between the tops of the peaks and the bottom of the valleys. This generally results in a finer textured finish. Conversely, greater Rq values mean a greater average depth from the tops of the peaks to the bottom of the valleys. This generally results in a coarser textured finish. It is important that a relatively low Rq value be maintained in order to minimize the potential negative effects on the optical performance due to possible mismatches in refractive indices. It has been found that a textured finish of the type described herein having an Rdq value, Rq value and RSm value falling within a narrowly specified range can produce good reflectivity and a sufficient amount of diffuseness in reflected light. Referring now to FIG. 5, there is shown an enlarged profile section view of a textured finish depicting the peaks and valleys of the surface having a given Rdq, Rq and RSm value. The illustration is simplified in that the slopes connecting the peaks and valleys are shown as being straight as apposed to varying forms and degrees of continuous arcs that would be more representative of the actual textured finish of the Diffuse Reflecting Form Texture. Nonetheless, FIG. 5 sufficiently illustrates the measurements Rdq, Rq and RSm. Peak 8 represents a single peak, and valleys 9 and 14 represent two valleys on either side of peak 8 of the illustrated textured finish. Dimension 10 represents the line length of the textured finish that is being measured. Reference line B-B represents the mean surface elevation, also referred to as a least square line, of the peaks and valleys such that equal areas of the textured finish profile within line length 10 lie above and below it. Reference line 12 is parallel to slope 11 that extends between peak 8 and valley 9. The angle of slope 11, as indicated by angle 13 of FIG. 5, is determined by the angle between reference lines 12 and B-B. The average slope angle for the given line length 10 of the textured finish is simply the sum of all the slope angles averaged together. In a similar manner, if some or all of the slopes of a given textured finish are arcs as opposed to straight line slopes, the slope angle of each slope is provided as an average, and all of the averaged slope angles are again averaged, resulting in an average slope angle along the line length measured. FIG. 5 serves only to explain what is meant by "slope angle" or "average slope angle" and is not intended to fully explain the well-known mathematics involved in calculating the root mean square of mean slope (Rdq). Rq is determined by measuring the surface height variations, such as the distance between peak 8 and valley 9, of all the peaks and valleys measured perpendicularly to reference line B-B within line length 10. As is the case of Rdq, FIG. 5 serves only to explain what is meant by "surface height variations" or "roughness" and is not intended to fully explain the routine mathematics involved in calculating the root mean square roughness (Rq). RSm is determined by counting the number of profile peaks within line length 10. A profile peak is the highest point of the profile between an upward and downward crossing of the mean line such as mean line B-B. Peak 8 represents a profile peak in that peak 8 is above mean line B-B, and corresponding valleys 9 and 14 are below mean line B-B. The RSm value relates to the average distance between peaks within a given line length. It is determined by the number of profile peaks counted in a given line length divided by the line length.

The manner in which the Rdq, Rq and RSm measurements are obtained is in accordance with industry standards for surface measurements. The Rdq, Rq and RSm measurements of the preferred embodiment of the present invention are made using a contact stylus measuring device and certain parameters. The parameters used for measuring the textured finish and acquiring the Rdq, Rq and RSm values include stylus tip radius, spatial frequencies, data density and minimum line length to be measured. The stylus tip radius is two micrometers. The spatial frequencies are one hundred microinches at the lower end and thirty thousandths of an inch on the upper end. The data density is an industry standard of approximately one data point per ten micro-inches (or, in metric units, approximately four data points per micron) of horizontal travel across the surface being measured. The minimum line length to be measured is eight millimeters. The Rdq of the textured finish of the Diffuse Reflecting Form Texture of the preferred embodiment is greater than 0.75 degrees and less than 6.5 degrees, and the Rq of the textured finish of the Diffuse Reflecting Form Texture of the preferred embodiment is greater than 5.9 micro-inches and less than 25.0 micro-inches. The RSm of the textured finish is greater than 0.0009 inches and less than 0.007 inches.

The Diffuse Reflecting Form Texture of the preferred embodiment is defined by a combination of the following parameters: a) the range of Rdq, Rq and RSm of the textured finish in combination with the parameters set forth for measuring the textured finish and obtaining the Rdq, Rq and RSm values; b) the featureless surface form upon which the textured finish is applied; and c) the random and continuous manner in which the peaks and valleys of the textured finish are arraigned on the featureless surface.

Figure 6A:
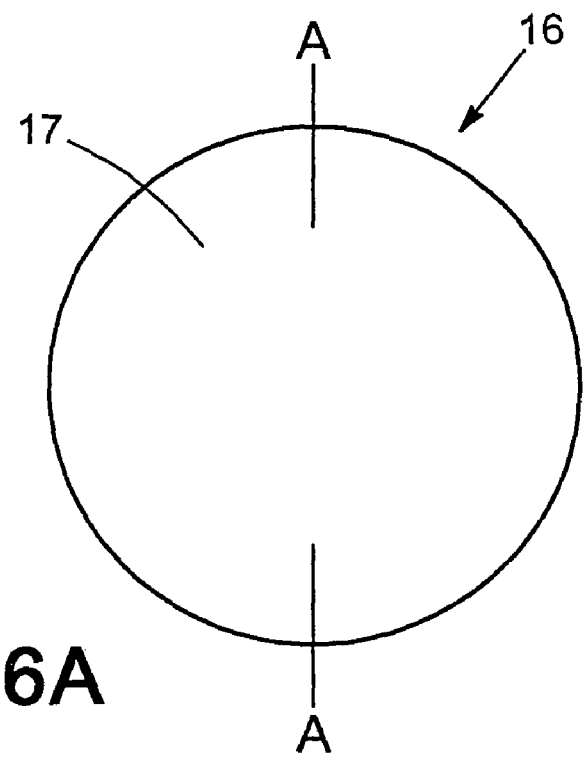
FIG. 6A is a front plan view of one of the lens elements of FIG. 2.
Figure 6B:
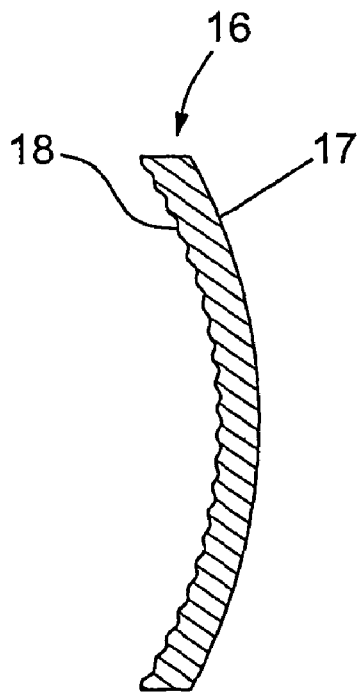
FIG. 6B is a cross-sectional diagram of the lens element of FIG. 6A taken along section line A-A.

FIG. 6A depicts a first lens element 16. A section view of first lens element 16, along section line A-A of FIG. 6A, is illustrated in FIG. 6B. First lens element 16 is shown in plan view in FIG. 6A from the surface 17 side. First lens element 16 has first and second surfaces, the second surface being the surface opposite the first surface. A lens element incorporating the Diffuse Reflecting Form Texture is hereinafter referred to as the first lens element, and the surface of the first lens element incorporating the Diffuse Reflecting Form Texture is referred to as the first surface. Surface 18 of first lens element 16 of FIG. 6B represents the first surface and surface 17 represents the second surface. Surface 17 of first lens element 16 is optically smooth, whereas surface 18 incorporates the Diffuse Reflecting Form Texture. The peaks and valleys that are depicted along surface 18 of FIG. 6B represent the peaks and valleys of the Diffuse Reflecting Form Texture. It should be noted that the peaks and valleys shown in the illustration are greatly exaggerated in terms of their size and form and are used to represent the presence of the Diffuse Reflecting Form Texture.

First lens element 16 is created by casting or injection molding an optical grade plastic material in a prepared mold. The mold that forms the first surface 18 of the first lens element 16 possesses the Diffuse Reflecting Form Texture, which is replicated in the first lens element during the casting or molding process. The processes of casting and injection molding are both common practices and well known in the optical industry. The creation of the Diffuse Reflecting Form Texture on the first surface 18 of the first lens element 16 is not solely confined to casting or injection molding. If working with a material such as polycarbonate, for example, the Diffuse Reflecting Form Texture can also be applied to the first surface 18 by the well-known method of embossing. The preferred material for first lens element 16 is an optical grade thermoplastic such as polycarbonate or a thermoset plastic material such as allyl diglycol carbonate, commonly known as CR-39, a trademark of PPG Industries.

One method of creating a mold that possesses a Diffuse Reflecting Form Texture is by using the well-known process of electroforming. Electroforming is a process that utilizes a mandrel that serves as a master to create a metal mold that can be used in a casting or injection molding process. The Diffuse Reflecting Form Texture can be created on the surface of the mandrel and then subsequently duplicated in the metal mold. One method that can be used to create the textured finish of the Diffuse Reflecting Form Texture is by bombarding the surface of the mold, or the mandrel used to create the mold, with a media, such as a glass bead media for example. When the media strikes the surface a small indention or distortion of the surface results, which in turn creates the peaks and valleys of the described textured finish. Creation of the textured finish is not limited to bombarding the surface with a media, however, this method works well in that it naturally creates peaks and valleys in a random and continuous manner and, as apposed to an etching process that cuts into the surface and removes surface material, it can be made to be less aggressive, allowing for more control in the creation of the textured finish. If necessary or desired, once the textured finish has been applied, the diffuse nature of the resulting textured finish can be subsequently reduced by means of electropolishing. The process of electropolishing is, however, not required to produce the textured finish of Diffuse Reflecting Form Texture. Electropolishing is simply an additional tool that can be used to control the reflective characteristics of the resulting textured finish. The methods and materials described for creating the Diffuse Reflecting Form Texture and the molds serve only as an example and are not intended to narrow the scope of the invention.

Figure 6C:
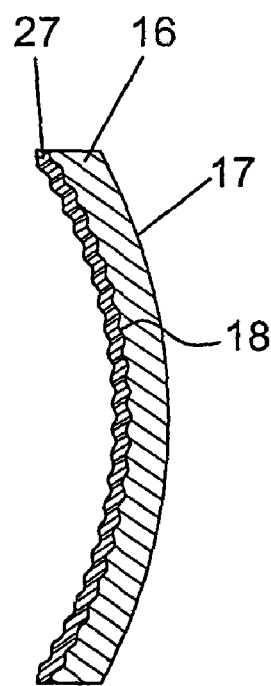
FIG. 6C is a cross-sectional diagram showing the application of a reflective medium to the lens element of FIGS. 6A and 6B.

The section view of first lens element 16 of FIG. 6B is shown again in FIG. 6C with a reflective medium 27 applied to first surface 18. First lens element 16 and reflective medium 27 of FIG. 6C represent first lens element 16 and reflective medium 27 of FIG. 2. Reflective medium 27 is applied to the first surface by means of vacuum-deposition. Vacuum-deposition is a proven means for applying the reflective medium 27 and is therefore the preferred method for doing so. The reflective medium 27 can be applied to the entire surface area of the first surface 18 or it can be applied to a selected portion of the first surface 18. For example, reflective medium 27 can be applied in a single or double gradient form. The application of a reflective medium in a gradient form is a common practice and is well known in the optical industry. The first surface 18 of the first lens element 16 having reflective medium 27 applied thereon represents, as defined herein, a prepared first surface 18. After the reflective medium 27 is applied to the first surface 18, first lens element 16, having a prepared first surface, can be laminated to the second lens element 19. Optical adhesive 28 of FIG. 2 is a binding element that conforms to the prepared first surface of the first lens element 16 and the adjacent surface of the second lens element 19. The adhesive 28 is applied in liquid form and is subsequently cured. It is preferred that adhesive 28 be an optical grade adhesive and be of the type that is cured by exposing it to an ultraviolet light source. The term "optical grade" simply refers to a grade of adhesive that is very clear. It is preferred that the optical adhesive 28 have a refractive index that closely matches that of the material used to create the first lens element 16. Adhesive types like these are commercially available from Norland Optics. Other types of adhesives that can be used include thermally cured adhesives, contact adhesives, epoxy adhesives and epoxy resins. The process and adhesives used for laminating two prefabricated solid-state lens elements together are well known in the optical industry, so no detailed description of the lamination process is given.

Figure 7A:
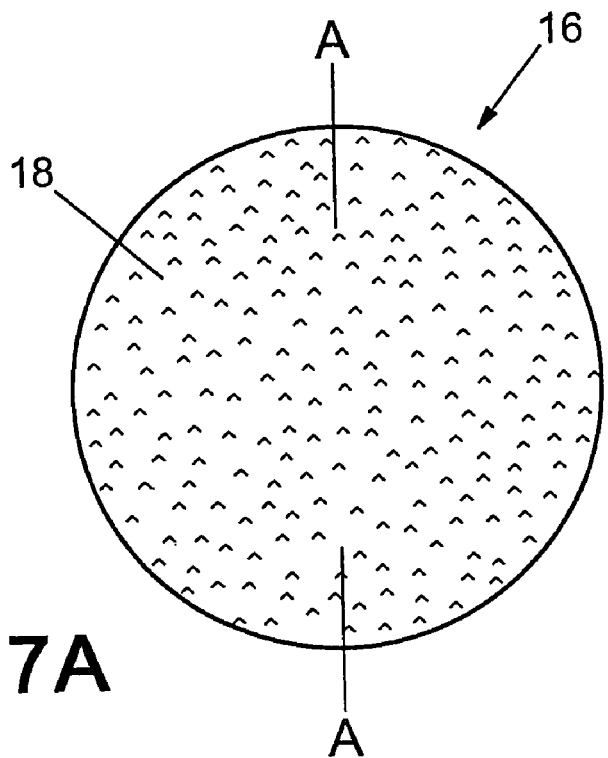
FIG. 7A is a front plan view of the lens element of FIG. 6A illustrating a variation thereof.
Figures 7B, 7C:
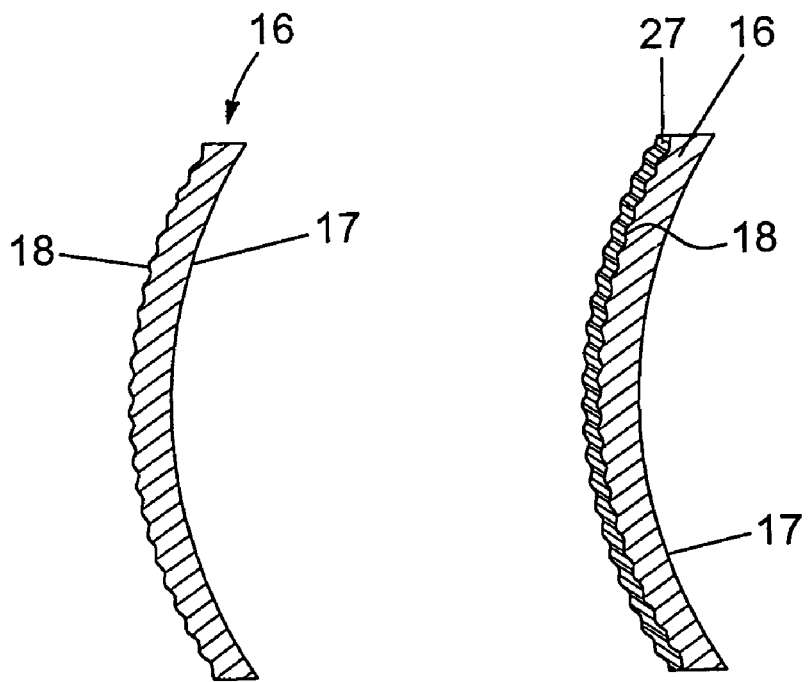
FIG. 7B is a cross-sectional diagram of the lens element of FIG. 7A taken along section line A-A.
FIG. 7C is a cross-sectional diagram showing the application of a reflective medium to the lens element of FIGS. 7A and 7B.

Lens element 16 of FIG. 7A represents a first lens element that is a variation on the first lens element 16 of FIG. 6A. A section view of first lens element 16 of FIG. 7A, taken along section line A-A, is shown in FIG. 7B. First lens element 16 of FIG. 7A is shown in plan view from the surface 18 side. Surface 18 of first lens element 16 of FIG. 7B represents the first surface and surface 17 represents the second surface. Second surface 17 of first lens element 16 of FIG. 7B is concave and optically smooth, whereas first surface 18 is convex and incorporates the Diffuse Reflecting Form Texture. The peaks and valleys that are depicted along first surface 18 of FIG. 7B represent the peaks and valleys of the Diffuse Reflecting Form Texture. The section view of first lens element 16 of FIG. 7B is shown again in FIG. 7C as having reflective medium 27 applied to first surface 18. As previously described, the reflective medium can be applied to the entire surface area of the first surface 18 or it can be applied to a selected portion of the first surface 18. For example, reflective medium 27 can be applied in a single or double gradient form. Reflective medium 27 applied to first surface 18 of FIG. 7C represents a prepared first surface 18.

Figure 8:
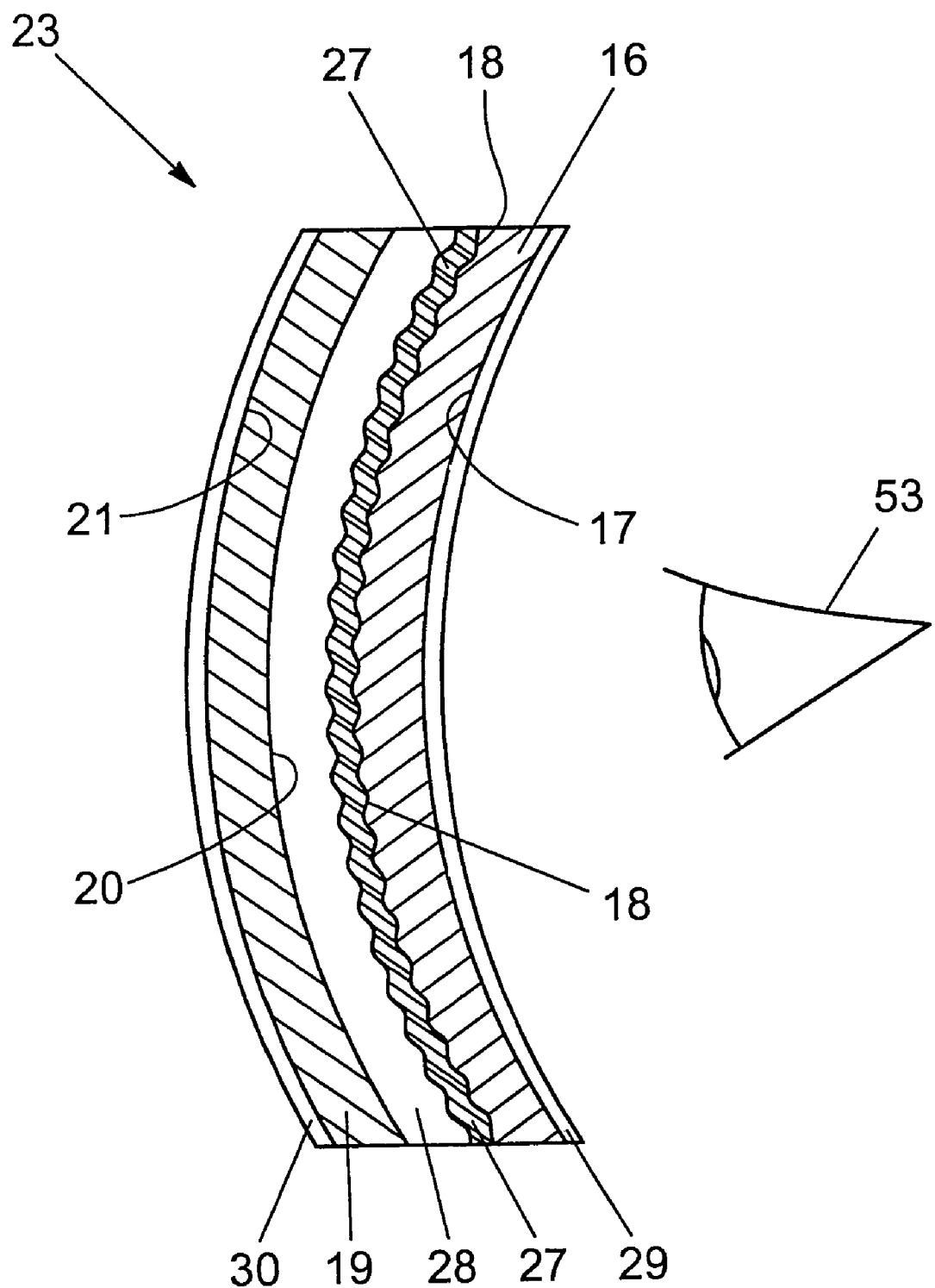
FIG. 8 is a cross-sectional view of the lens of FIGS. 1 and 2 illustrating a variation thereof that incorporates the lens element and reflective medium of FIG. 7C.

FIG. 8 depicts a Diffuse Reflecting Lens that is a variation on the lens construction of FIG. 2 and incorporates the first lens element of FIG. 7A. The Diffuse Reflecting Lens of FIG. 8 is a section view of Diffuse Reflecting Lens 23 of FIG. 1, taken along section line A-A. First lens element 16 and reflective medium 27 of FIG. 8 are the same as first lens element 16 and reflective medium 27 of FIG. 7C. Surfaces 17 and 21 illustrated in FIG. 8 are outer surfaces having anti-reflective coatings 29 and 30, respectively, applied thereon. Eye 53 of FIG. 8 represents the eye of a wearer and is shown to illustrate the backside of the Diffuse Reflecting Lens of FIG. 8. Surface 17 represents the back surface and is located on the backside of the Diffuse Reflecting Lens of FIG. 8 adjacent eye 53. Surface 17 of first lens element 16 of FIG. 8 is optically smooth and is shown as a concave surface. Surface 21 of second lens element 19 of FIG. 8 is optically smooth and is shown as a convex surface opposite surface 17. Surface 21 represents the front surface and is located on the front side of the Diffuse Reflecting Lens of FIG. 8. Therefore, as worn, surface 21 is on the side of the Diffuse Reflecting Lens of FIG. 8 that is viewed by an observer. With respect to the Diffuse Reflecting Lens constructions of FIGS. 2 and 8, the manner in which the second lens element 19 is fabricated is similar to that of the first lens element 16 except that it does not incorporate a Diffuse Reflecting Form Texture on either of its surfaces as it would apply to surfaces 20 and 21 of second lens element 19 of FIGS. 2 and 8.

Figure 9:
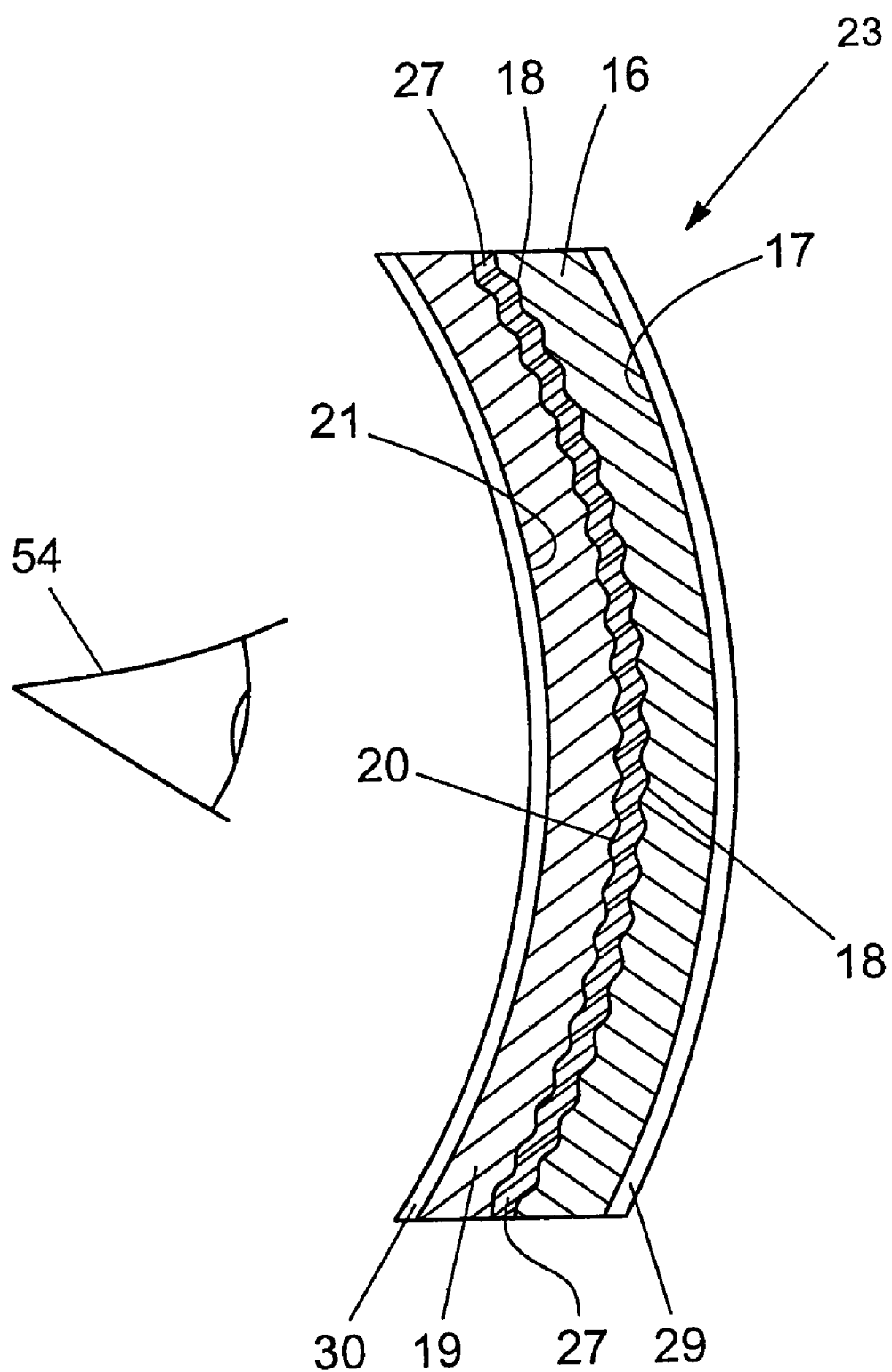
FIG. 9 is a cross-sectional view of the lens of FIGS. 1 and 2 illustrating a variation thereof that incorporates the lens element and reflective medium of FIG. 6C.

FIG. 9 depicts a Diffuse Reflecting Lens that represents another variation on the lens construction of FIG. 2. The lens construction of FIG. 9 does not include optical adhesive 28. The Diffuse Reflecting Lens of FIG. 9 is a section view of Diffuse Reflecting Lens 23 taken along section line A-A of FIG. 1. First lens element 16 and reflective medium 27 of FIG. 9 is the same as first lens element 16 and reflective medium 27 of FIG. 6C. Surfaces 17 and 21 of FIG. 9 are outer surfaces having anti-reflective coatings 29 and 30, respectively, applied thereon. Eye 54 FIG. 9 represents the eye of a wearer and is shown to illustrate the backside of the Diffuse Reflecting Lens of FIG. 9. Surface 21 represents the back surface and is located on the backside of the Diffuse Reflecting Lens of FIG. 9 adjacent eye 54. Surface 21 of second lens element 19 of FIG. 9 is optically smooth and is shown as a concave surface. Surface 17 of first lens element 16 of FIG. 9 is optically smooth and is shown as a convex surface opposite surface 21. Surface 17 represents the front surface and is located on the front side of the Diffuse Reflecting Lens of FIG. 9. Therefore, as worn, surface 17 is on the side of the Diffuse Reflecting Lens of FIG. 9 that is viewed by an observer.

Figure 10:
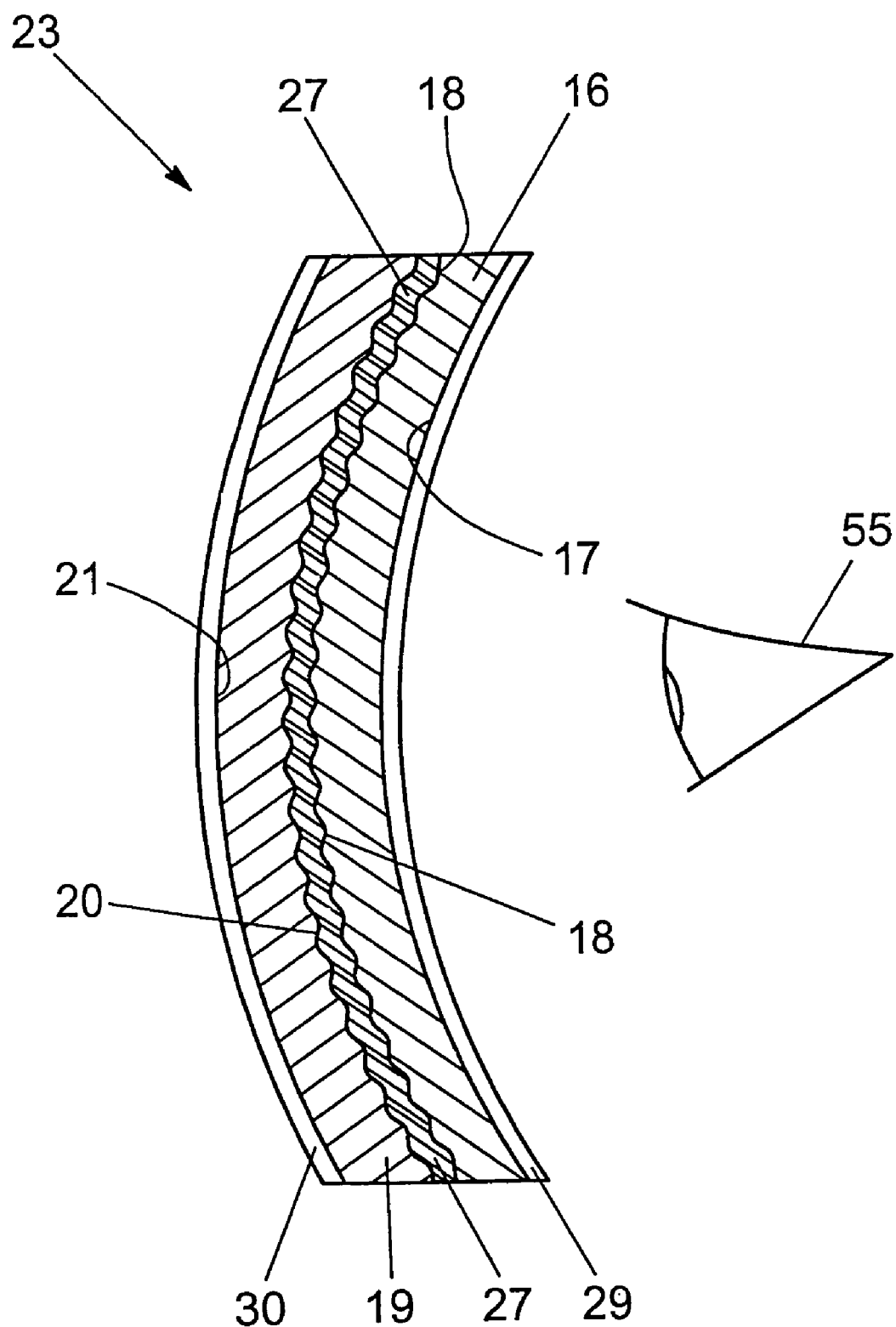
FIG. 10 is a cross-sectional view of the lens of FIGS. 1 and 2 illustrating a variation thereof that incorporates the lens element and reflective medium of FIG. 7C.

FIG. 10 depicts a Diffuse Reflecting Lens that represents another variation on the lens construction of FIG. 2. The lens construction of FIG. 10 is similar to the lens construction of FIG. 9 in that it also does not include optical adhesive 28. The Diffuse Reflecting Lens of FIG. 10 is a section view of Diffuse Reflecting Lens 23 taken along section line A-A of FIG. 1. First lens element 16 and reflective medium 27 of FIG. 10 is the same as first lens element 16 and reflective medium 27 of FIG. 7C. Surfaces 17 and 21 of FIG. 10 are outer surfaces having anti-reflective coatings 29 and 30, respectively, applied thereon. Eye 55 of FIG. 10 represents the eye of a wearer and is shown to illustrate the backside of the Diffuse Reflecting Lens of FIG. 10. Surface 17 depicts the back surface and is located on the backside of the Diffuse Reflecting Lens of FIG. 10 adjacent eye 55. Surface 17 of first lens element 16 of FIG. 10 is optically smooth and is shown as a concave surface. Surface 21 of second lens element 19 FIG. 10 is optically smooth and is shown as a convex surface opposite surface 17. Surface 21 represents the front surface and is located on the front side of the Diffuse Reflecting Lens of FIG. 10. Therefore, as worn, surface 21 is on the side of the Diffuse Reflecting Lens of FIG. 10 that is viewed by an observer.

In the case of the Diffuse Reflecting Lens constructions of FIGS. 9 and 10, instead of the second lens element 19 being a prefabricated lens element laminated to the prepared first surface 18 of the first lens element 16 the second lens element 19 is applied to the prepared first surface 18 of the first lens element 16 in liquid form and then solidified, resulting in reflective medium 27 being encapsulated within the Diffuse Reflecting Lens of FIGS. 9 and 10 between first lens element 16 and second lens element 19. The manner in which this is done involves placing first lens element 16 having a prepared first surface 18 into a mold and casting or injection molding second lens element 19 into place. During this process, the plastic material used to create the second lens element 19 conforms to and fills in the peaks and valleys created by the Diffuse Reflecting Form Texture and forms an optically smooth surface 21. It is necessary for the material used to create the first and second lens elements 16, 19 to have matched or very closely matched refractive indices. Therefore, it is desirable for the first and second lens elements 16, 19 to be made of the same type of plastic material. Once the second lens element 19 has been cast or injection molded into place, anti-reflective coatings 29 and 30 of FIGS. 9 and 10 can be applied. As described in the prior art, an additional adhesion-promoting element can be included in the lens constructions of FIGS. 9 and 10 to facilitate the bonding of the second lens element 19 to the prepared first surface 18 of the first lens element 16.

The Diffuse Reflecting Lens constructions of FIGS. 2, 8, 9 and 10 can alternatively be made flat and not curved. If a Diffuse Reflecting Lens is to be manufactured in the form of a unitary lens, it is preferred that the material used to create the first and second lens elements 16, 19 be of a type that is flexible and highly impact resistant, such as polycarbonate. The reason for this is that the size, or surface area, of a Diffuse Reflecting Lens that is in the form of a unitary lens is considerably larger than a Diffuse Reflecting Lens that has been cut down and installed in a left or right lens location of a dual-lens eyewear system and is therefore much more susceptible to significant distortion due to accidental impact.

Generally speaking all described lens elements such as the reflective medium 27 and the first and second lens elements 16, 19, for example, inherently absorb some amount of light. It is not these lens elements, however, that, in and of themselves, serve the function of providing meaningful light absorption and protection from the sun's rays as is the function of a sunglass lens. To serve as a sunglass lens, it is desirable that the lens constructions of FIGS. 2, 8, 9 and 10 have an additional light-absorbing lens element included in the construction. Tint elements used to provide meaningful light absorption come in various forms such as molecular catalytic dye, pre-colored optical grade plastic, vacuum-deposited tint coatings and polarized film. All of these tint forms are common to the optical industry and can be employed in the various lens constructions of the Diffuse Reflecting Lens. It is to be understood that the coloring of the plastic is synonymous with the tinting of plastic since the color serves to tint the plastic. The lens element that provides the meaningful light absorbing function is positioned between the reflective medium 27 and the eye of the wearer. The light absorbing tint not only serves to protect the eyes of the wearer from bright light but it also reduces and absorbs backside reflections off the reflective medium 27, as in the case of metallic reflective mediums, that would otherwise be reflected back toward the eyes of the wearer.

In the case of pre-colored plastic or molecular catalytic dyes, the light-absorbing element is or becomes part of the described lens element itself. Referring now to FIGS. 2 and 9, when using pre-colored plastic or molecular catalytic dyes, it is second lens element 19 that is given the light-absorbing tint. In the case of the Diffuse Reflecting Lenses of FIGS. 8 and 10, it is first lens element 16 that is given the light-absorbing tint. For example, second lens element 19 of FIG. 2 or first lens element 16 of FIGS. 8 and 10 can be manufactured of clear or uncolored thermoset plastic, such as allyl diglycol carbonate and then subsequently tinted a desired color by exposing the lens element to a heated liquid molecular catalytic dye solution wherein the plastic absorbs the colored dye. In the case of a molecular catalytic dye, it is preferred that the lens element to be tinted be tinted prior to the lamination process and the application of any lens coatings. Tinting by means of molecular catalytic dyes is preferably and normally limited to thermoset plastics as opposed to thermoplastics, such as polycarbonate. Thermoset plastic material can also be pre-colored, in which case the lens element can be cast as a tinted lens. In the case of the Diffuse Reflecting Lens of FIG. 9, it is preferred that second lens element 19 be cast using a pre-colored plastic. It is also preferred that when using a thermoplastic to create second lens element 19 of FIG. 2 or first lens element 16 of FIGS. 8 and 10, that the plastic be pre-colored.

In the case of vacuum-deposited tint coatings or polarized film, these light-absorbing elements can be used in lieu of the aforementioned dyes or colored plastic. Like the previously described vacuum-deposited reflective coatings and anti-reflective coatings, vacuum-deposited tints are also very thin. Vacuum-deposited tints are typically made of magnesium fluoride or a silicon type medium. There are a number of ways in which a vacuum-deposited tint can be incorporated into the Diffuse Reflecting Lens constructions of FIGS. 2 and 8. A selected one of surfaces 20, 21 of FIG. 2 can have a vacuum-deposited tint applied to the surface. If the vacuum-deposited tint is applied to surface 21 of FIG. 2, it can be in lieu of anti-reflective coating 30 or it can be positioned between surface 21 and anti-reflective coating 30. If the vacuum-deposited tint is applied to surface 20, it is done so prior to the lamination process. If desired, the vacuum-deposited tint can be positioned between reflective medium 27 of FIG. 2 and optical adhesive 28 in which case the tint is applied to the reflective medium prior to the lamination process. In the case of the Diffuse Reflecting Lens of FIG. 8, the vacuum-deposited tint can be applied to either first surface 18 or surface 17. If the tint is applied to first surface 18, it is done so prior to application of reflective medium 27, in which case the vacuum-deposited tint is positioned between surface 18 and reflective medium 27. If the vacuum-deposited tint is applied to surface 17 of FIG. 8, it can be in lieu of anti-reflective coating 29 or it can be positioned between surface 17 and anti-reflective coating 29. The use of vacuum-deposited tints is described in detail in the referenced prior art. Further, the incorporation of vacuum-deposited tints in a lens, including a lens element having a relief pattern on one surface, wherein the relief pattern is a holographic diffraction pattern having a reflective medium applied thereon, is the subject of U.S. Pat. No. 4,840,444.

Figure 11A:
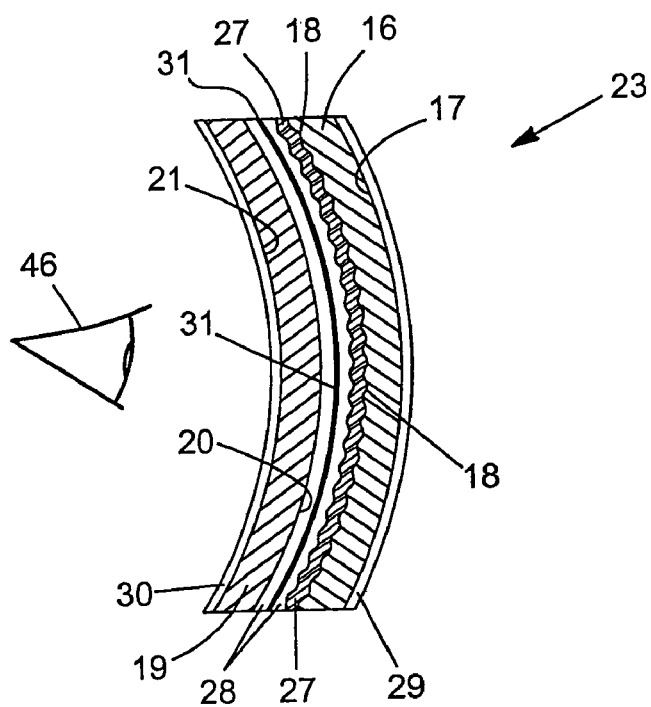
FIGS. 11A-11C are cross-sectional diagrams illustrating various ways of incorporating a polarized film in the lens of FIGS. 1 and 2.
Figure 11B:
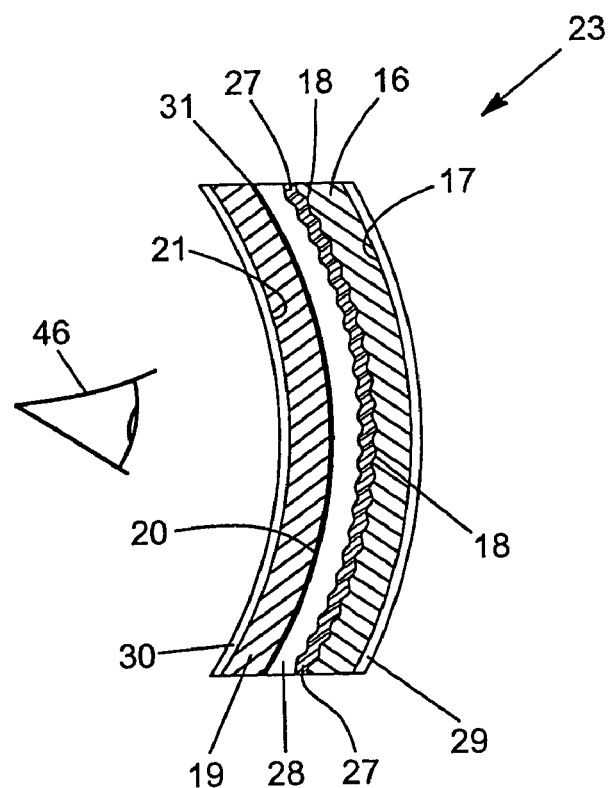
Figure 11C:
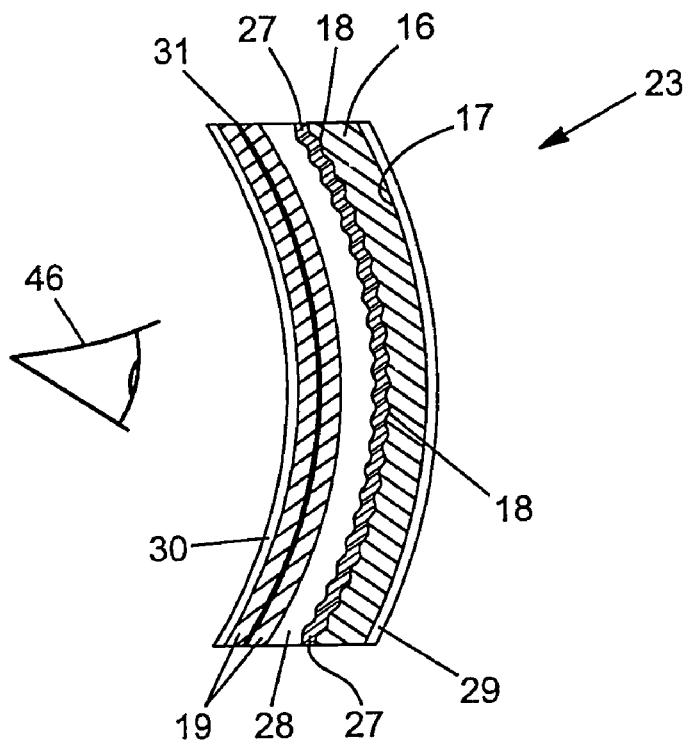
Figure 11D:
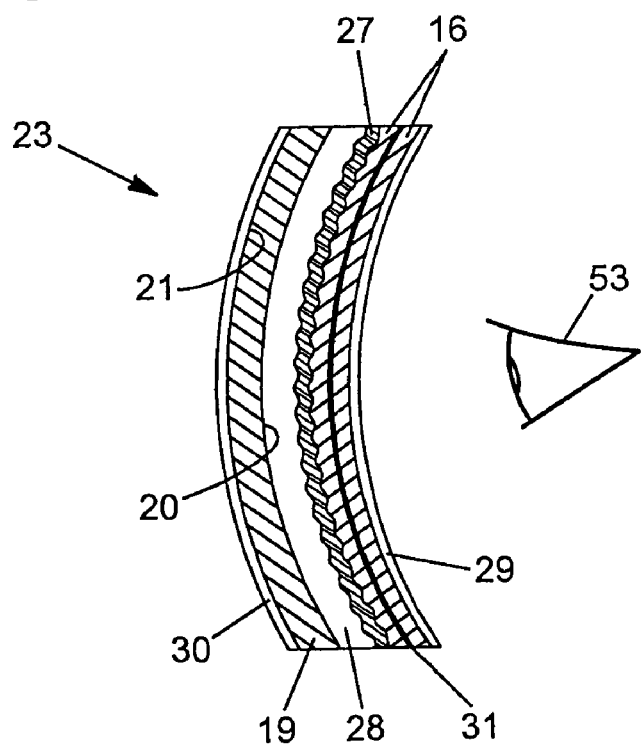
FIG. 11D is a cross-sectional diagram illustrating a way of incorporating a polarized film in the lens of FIGS. 1 and 8.

A very effective and popular light absorbing lens element is polarized film. FIGS. 11A-11C depict three ways in which a polarized film can be incorporated into the Diffuse Reflecting Lens of FIG. 2. In FIG. 11A polarized film 31 is encapsulated within optical adhesive 28 positioned between surface 20 and reflective medium 27. The polarized film 31 is incorporated in the lens construction of FIG. 11A by positioning it within the optical adhesive 28 during the lamination process. The inclusion of a polarized film sandwiched between two solid-state lens elements is from prior art U.S. Pat. No. 4,838,673. This prior art does not, however, describe the use of a polarized film within a lens construction similar to that of a Diffuse Reflecting Lens. FIG. 11B illustrates polarized film 31 bonded to surface 20 of second lens element 19. The polarized film 31 is incorporated in the lens construction of FIG. 11B by first bonding the polarized film 31 to surface 20 of second lens element 19 prior to second lens element 19 being laminated to the prepared first surface 18 of first lens element 16. FIG. 11C illustrates polarized film 31 encapsulated within second lens element 19 wherein the polarized film is encapsulated within second lens element 19 at the time the second lens element 19 is cast or injection molded. FIG. 11D illustrates the Diffuse Reflecting Lens of FIG. 8 having a polarized film 31 encapsulated within first lens element 16 wherein the polarized film is encapsulated within first lens element 16 at the time the first lens element 16 is cast or injection molded. The described encapsulation of a polarized film within a lens element involves methods that are known to the industry.

Regardless of the tint element used to provide the meaningful light absorbing function, the tint element is positioned between the reflective medium 27 and the eye of the wearer such as eye 46 of FIG. 2, eye 53 of FIG. 8, eye 54 of FIG. 9 and eye 55 of FIG. 10. The described tint elements, whether they are in the form of dyes, pre-colored plastic, vacuum-deposited tint coatings or polarized film, normally range in color from varying shades of gray or brown. In addition to the application of a tint element, protection against harmful ultraviolet light rays is also provided for by means of treating the lens material used to create the first and/or second lens elements. The methods and additives used to treat lens elements for blocking harmful ultraviolet light rays are well known in the industry.

Alternatively, in some fashion applications, a light-absorbing tint can be omitted, in which case the Diffuse Reflecting Lens can be utilized as a fashion lens. When not incorporating a tint element, the Diffuse Reflecting Lens works well when using vacuum-deposited dielectric coatings. This is because dielectric coatings have the unique ability to reflect brightly in one direction; that is, they can be made to reflect brightly from the front side of the Diffuse Reflecting Lens while having little reflection from the backside of the Diffuse Reflecting Lens. A Diffuse Reflecting Lens not incorporating a light-absorbing tint is more suitable for a low light environment than for use as a true sunglass lens because it will not attenuate or absorb as much light.

In another embodiment of the present invention, the front surface of the Diffuse Reflecting Lens such as surface 17 of first lens element 16, as it would apply to the Diffuse Reflecting Lenses of FIGS. 2 and 9, or surface 21 of second lens element 19, as it would apply to the Diffuse Reflecting Lenses of FIGS. 8 and 10, is in the form of an anti-reflective micro pattern such as a micro pattern commonly known as a moth eye micro pattern. A moth eye micro pattern is a type of surface pattern that can be incorporated into the surface of a transparent substrate in lieu of a conventional optically smooth surface that, like a conventional anti-reflective coating, eliminates the majority of specular surface reflection coming from that surface while at the same time allowing light to pass through the surface effectively unobstructed. A moth eye micro pattern is a surface pattern and not a coating applied to a surface, as is an anti-reflective coating. On a very small scale, a moth eye micro pattern looks like conical pyramids or the bottom side of an egg carton. However, the surface pattern is not visible to the naked eye and does not distort light transmitted through its surface. A moth eye micro pattern can be formed on the lens surface or surfaces during the casting or injection molding process or, if working with a thermoplastic such as polycarbonate, it can be embossed into the described surface or surfaces. A benefit of incorporating a moth eye micro pattern into a Diffuse Reflecting Lens is that it eliminates an additional step of applying an anti-reflective coating. In a similar manner, if desired, a moth eye micro pattern can be additionally incorporated into the surface on the backside of the Diffuse Reflecting Lens, such as surface 21 of second lens element 19 of FIGS. 2 and 9 or surface 17 of first lens element 16 of FIGS. 8 and 10.

An anti-reflective surface treatment such as an anti-reflective coating or an anti-reflective micro pattern is applied to the front surface of the Diffuse Reflecting Lens, such as surface 17 of FIGS. 2 and 9 and surface 21 of FIGS. 8 and 10, for a number of reasons. First and foremost its purpose is to remove the majority of the specular reflection that would otherwise come from the front surface of the Diffuse Reflecting Lens so that the vast majority of light being reflected from the Diffuse Reflecting Lens comes from the reflective medium itself, in turn allowing for a uniform diffuse omni-directional reflection substantially void of specular reflection. A second purpose is to increase the amount of light reaching the reflective medium and correspondingly increase the amount of light reflected back to an observer by the same. Because the Diffuse Reflecting Form Texture reflects light in a diffuse manner it does not produce as bright or as concentrated a reflection as would a polished or optically smooth surface. Therefore, anything that can be done to improve its reflectivity short of increasing the amount of reflective medium is beneficial. It is important to maintain a high level of brightness in reflected light so that an observer sees a uniform diffuse omni-directional reflection and not the eyes of the wearer. Thirdly, it is to reduce internal reflections resulting from light that is reflected by the reflective medium re-reflecting off the front surface of the lens back toward the eye of the wearer. The subject matter of internal reflections and the use of anti-reflective coatings to counter it are discussed in the referenced prior art of the present inventor. As is common with many conventional sunglass lens types, it is preferred that an anti-reflective surface treatment also be placed on the surface that is on the backside of the Diffuse Reflecting Lens adjacent the eye of the wearer, such as surface 21 of FIGS. 2 and 9 and surface 17 of FIGS. 8 and 10, for the purpose of enhancing the optical performance by reducing reflections off the backside of the lens that would otherwise interfere with a wearer's vision.

Figure 12A:
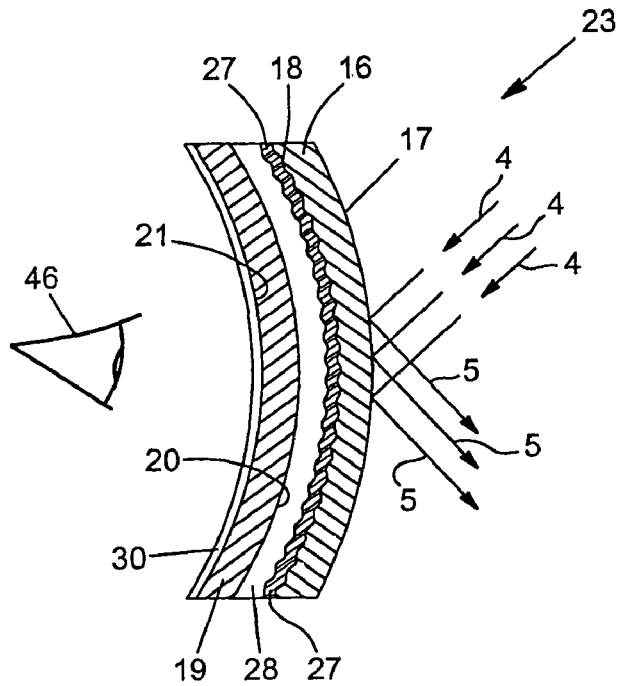
FIG. 12A is a cross-sectional diagram of the lens of FIGS. 1 and 2 illustrating the manner in which light reflects off the surface of the lens without an anti-reflective coating.
Figure 12B:
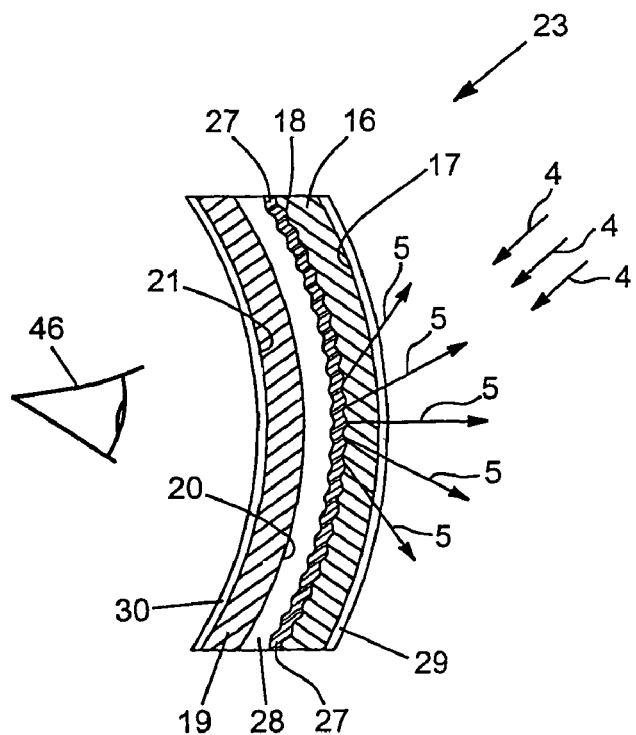
FIG. 12B is a cross-sectional diagram of the lens of FIGS. 1 and 2 illustrating the manner in which light reflects off the surface of the lens with an anti-reflective coating.

To illustrate the effect of the anti-reflective coating and how it relates to the performance of the Diffuse Reflecting Lens, FIGS. 12A and 12B illustrate how light reflects from the front side of the Diffuse Reflecting Lens of FIG. 2, both with and without anti-reflective coating 29 on front surface 17. The manner in which light passes through the lens construction is well understood and described in the prior art.

FIG. 12A depicts the Diffuse Reflecting Lens of FIG. 2 without anti-reflective coating 29. Light rays 5 of FIG. 12A represent light rays 4 reflecting off of surface 17 in a specular manner. It is light rays 5 of FIG. 12A that are reflected back to an observer in the form of coherent images of environmental surroundings such as in the form of the observer's own reflection. The illustration of FIG. 12A is simplified in that the drawing depicts all light rays 4 as reflecting off of surface 17 in the form of light rays 5 when in fact a portion of light rays 4 will also reflect off of reflective medium 27 as well as pass through the entire lens construction. The amount of light reflected off of surface 17, however, will significantly reduce the perceived reflection of light coming from reflective medium 27. The illustration of FIG. 12B depicts anti-reflective coating 29 allowing light rays 4 to pass through surface 17 without being reflected by surface 17, reflect off of reflective medium 27, and then pass back through surface 17 without being re-reflected by surface 17. Light rays 5 of FIG. 12B represent light reflected back to an observer in a uniform diffuse omni-directional manner. The anti-reflective coating 29 allows more light to pass through surface 17 and inhibits the reflection that would otherwise be produced by surface 17 to interfere with the reflection produced by the reflective medium. As in the illustration of FIG. 12A, the illustration of FIG. 12B is also simplified in that a small portion of light will also reflect off of the anti-reflective coating 29 as well as pass through the entire lens construction. However, the amount of light reflected off of the reflective medium 27 is considerably greater than the light being reflected off the anti-reflective coating 29. Further, the greater the amount of light being reflected off reflective medium 27, the less apparent the reflection coming from anti-reflective coating 29 will be. The described effect of the anti-reflective coating 29 can similarly be achieved with the moth eye micro pattern. It is to be understood that the described performance of the anti-reflective coating 29 of FIG. 12B also applies to anti-reflective 29 of the Diffuse Reflecting Lens of FIG. 9 as well as anti-reflective coating 30 of the Diffuse Reflecting Lenses of FIGS. 8 and 10.

If desired, scratch resistant coatings can be applied to surfaces 17, 21 of the Diffuse Reflecting Lenses of FIGS. 2, 8, 9 and 10. Depending on the type of material used to create first and second lens elements 16 and 19, respectively, scratch resistant coatings may or may not be needed. For example, in the case of the thermoset material commonly known as CR39, a trademark of PPG industries, the material is relatively hard and does not necessarily require scratch resistant coatings. If the material used is glass, scratch resistant coatings are not needed. In the case of many thermoplastics, such as polycarbonate, scratch resistant coatings are usually required. Most scratch resistant coatings are applied to the respective surfaces of a lens in liquid form by means of spin coating or dip coating and then subsequently cured to a hardened state. Both dip coating and spin coating are well-known practices common to the optical industry. As it relates to the Diffuse Reflecting Lens, scratch resistant coatings, if applied, are applied prior to the described application of the anti-reflective coating or coatings. For example, if both a scratch resistant coating and an anti-reflective coating are applied to an outer surface of the Diffuse Reflecting Lens, such as surface 17 or 21 of FIGS. 2, 8, 9 or 10, the scratch resistant coating is positioned between the surface it is applied to and the anti-reflective coating. That is to say, for example, if a scratch resistant coating is applied to front surface 17 FIG. 2, then the scratch resistant coating forms the surface to which the anti-reflective coating, such as anti-reflective coating 29, is applied. In this case, the scratch resistant coating is positioned between surface 17 and anti-reflective coating 29. If, however, a moth eye micro pattern is used as described, a scratch resistant coating of the conventional liquid type cannot be used in conjunction with it without negating the desired function of the moth eye micro pattern. This is because the liquid scratch resistant coating would fill in the surface micro pattern and provide in its place a conventional optically smooth surface that would reflect light in a specular manner.

If desired, the Diffuse Reflecting Lens can be color tinted to enhance its aesthetic appearance from an observer's point of view, in which case the color tint is placed between the reflective medium and an observer, or in other words, on the side of the reflective medium opposite the eye of the wearer. For example, first lens element 16 of FIGS. 2 and 9 can be tinted a color of red, blue or yellow to give the Diffuse Reflecting Lens of FIGS. 2 and 9 the appearance of the corresponding color from an observer's point of view. Similarly, second lens element 19 of FIGS. 8 and 10 can be color tinted to give the Diffuse Reflecting Lens constructions of FIGS. 8 and 10 the appearance of the corresponding color from an observer's point of view. Similar to the tinting methods previously described, depending on the material used to create the lens element to be colored, it can be tinted by means of molecular catalytic dye or the material used to create the lens element can be pre-colored prior to casting or injection molding. When providing a color tint for aesthetic purposes, the amount of tint used is minimal in order to minimize its absorbing function. In this case, the purpose of tinting the described lens element is only to provide color to light reflected by the reflective medium and not to reduce the amount of light reflected. An alternative method for adding color to the Diffuse Reflecting Lenses of FIGS. 2, 8, 9 and 10 is to simply use a reflective medium, such as a vacuum-deposited dielectric coating, that is designed to reflect a desired color such as blue, green or gold.

Once a Diffuse Reflecting Lens construction is complete, it can be cut down so that it can be installed in an eyewear system of choice. If desired, surface coatings such as the described anti-reflective coating or coatings can be applied before or after the Diffuse Reflecting Lens is cut down. Two methods, one referred to as an edging process and the other referred to as a stamping process, are commonly employed within the optical industry for cutting down an oversize lens as desired. The method of cutting down a lens by means of an edging process is commonly preferred for lenses that are to be installed in a left or right lens location of a dual-lens eyewear system. The method of cutting down a lens by means of a stamping process mainly applies to a flat sheet lens construction made of a thermoplastic material such as polycarbonate. The stamping process can be used for creating a unitary lens shape from an uncut Diffuse Reflecting Lens made of a thermoplastic as a flat sheet construction The size and shape of an uncut Diffuse Reflecting Lens and a Diffuse Reflecting Lens that has been cut down so that it can be installed in an eyewear system is determined by its perimeter. That is, a given shape and a given perimeter length will determine the size of the lens. The uncut Diffuse Reflecting Lens 23 of FIG. 1 is shown again in FIG. 13A in plan view from the front side wherein the shape and size of uncut Diffuse Reflecting Lens 23 of FIG. 1 is depicted by perimeter 33 of FIG. 13A. The uncut Diffuse Reflecting Lens 23 of FIG. 13A is shown again in FIG. 13B after being cut down, such as by means of an edging process, so that it can be installed in a dual-lens eyewear system such as that depicted in FIG. 14. The cut down Diffuse Reflecting Lens 23 of FIG. 13B is shown in plan view from the front side. The shape and size of the cut down Diffuse Reflecting Lens 23 of FIG. 13B is depicted by perimeter 34.

Figure 13B:
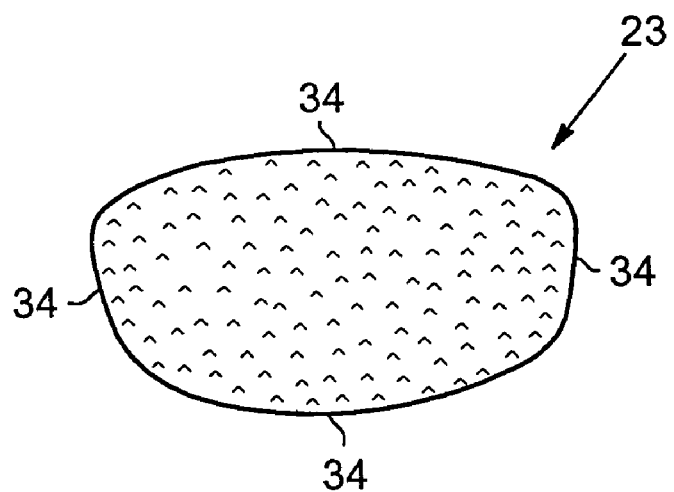
FIG. 13B is a front plan view of the lens of FIG. 1 illustrating the perimeter thereof after being cut down to a desired shape and size.
Figure 14:
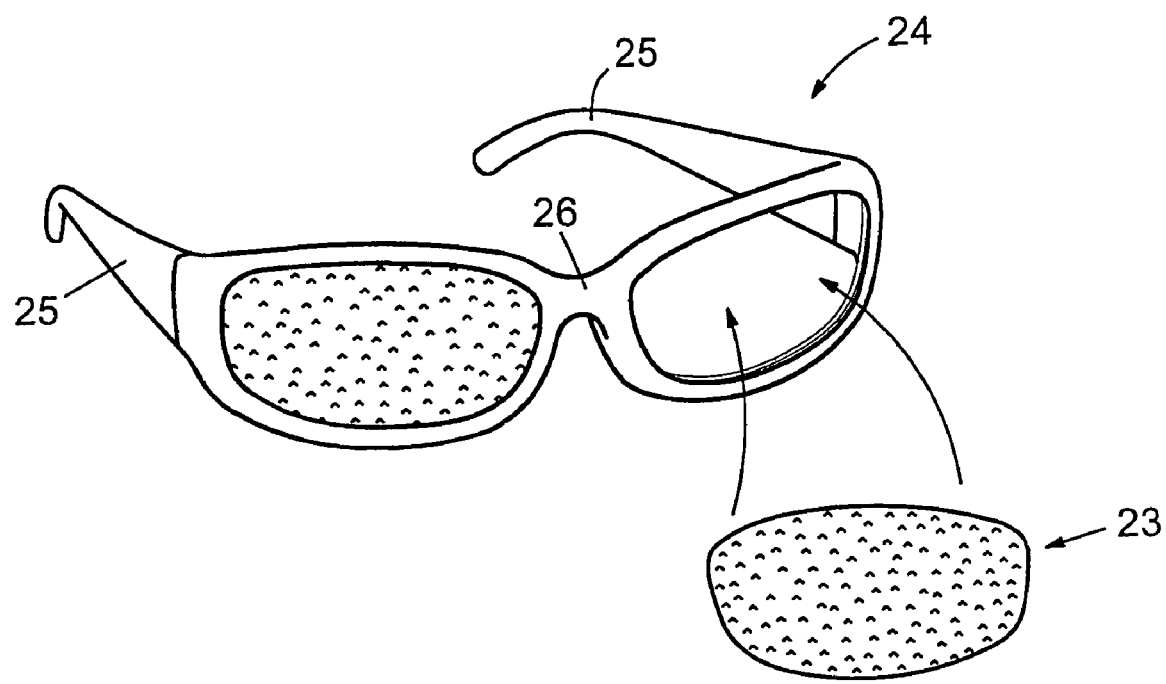
FIG. 14 is a pictorial diagram of a dual-lens eyewear system illustrating the lens of FIG. 13B preparatory to being installed in the dual-lens eyewear system.
Figure 15:
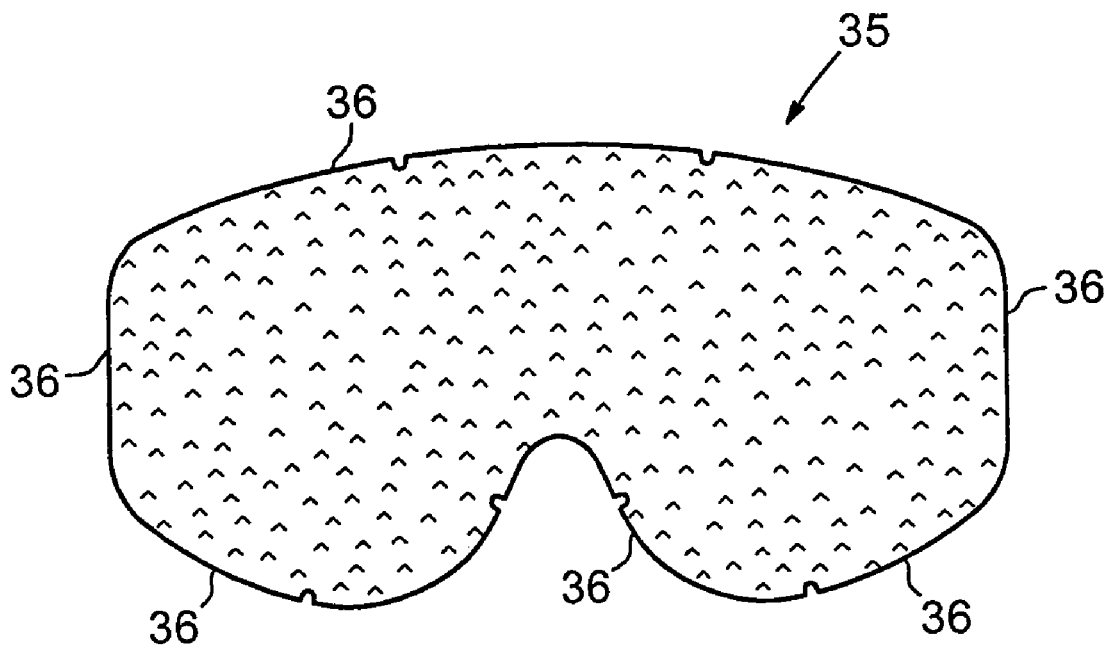
FIG. 15 is a front plan view of a unitary lens of the present invention illustrating a typical perimeter thereof.
Figure 16:
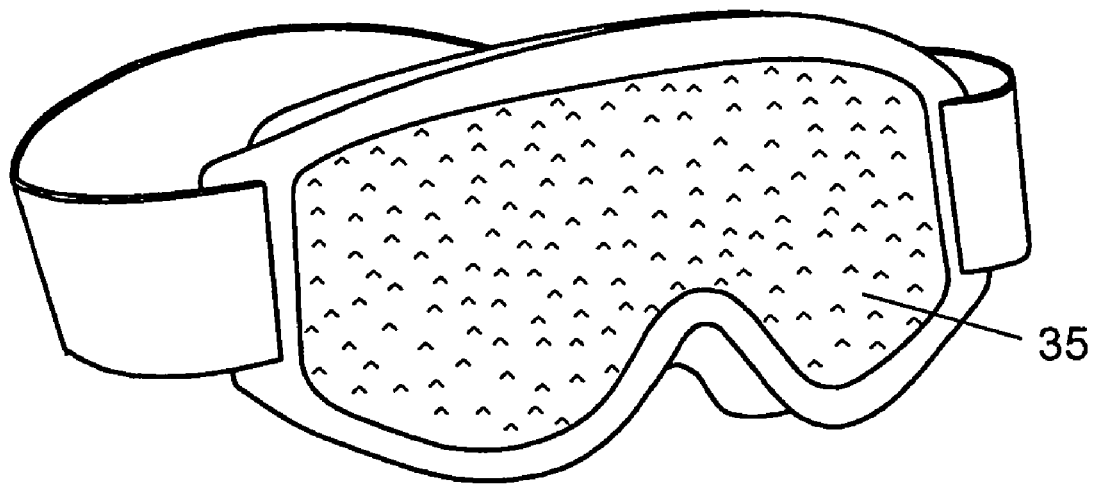
FIG. 16 is a pictorial diagram of the unitary lens of FIG. 15 installed in a typical goggle.

In FIG. 14 there is shown an eyewear system 24 having a frame 26 and temples 25. Eyewear system 24 represents a dual-lens eyewear system and is shown from the front side, or in other words, from an observer's point of view. Viewed from the front side, a dual-lens eyewear system has a left lens location and a right lens location such that, as worn, the left lens location corresponds to a wearer's right eye and the right lens location corresponds to a wearer's left eye. The cut down Diffuse Reflecting Lens 23 of FIG. 13B is shown again in FIG. 14 prior to being installed in the right lens location of dual-lens eyewear system 24. Diffuse Reflecting Lens 23 of FIG. 14 is shown from the front side. FIG. 15 depicts a Diffuse Reflecting Lens 35 that has been cut down in the form of a unitary lens shape from a flat sheet lens construction so that it can be installed in a unitary lens eyewear system. The cut down Diffuse Reflecting Lens 35 of FIG. 15 is shown in plan view from the front side. The shape and size of the cut down Diffuse Reflecting Lens 35 FIG. 15 is depicted by perimeter 36. FIG. 16 shows the Diffuse Reflecting Lens of FIG. 15 installed in a goggle. The methods described for cutting down a Diffuse Reflecting Lens serve only as examples of a proven means for doing so and are by no means intended to narrow the scope of the invention.

The Diffuse Reflecting Lens of the present invention can be manufactured and marketed as an uncut Diffuse Reflecting Lens to other manufacturers or it can be cut down and installed in an eyewear system and marketed as a finished product. In the case of it being marketed as an uncut Diffuse Reflecting Lens, the intent is for the purchaser to cut down the uncut Diffuse Reflecting Lens and install it in an eyewear system of choice. It is well known that commonly available eyewear systems and the common lenses that come installed in them are manufactured in many different sizes and shapes and that logos or other decorative effects can be and commonly are positioned around the periphery of a lens area, outside a wearer's normal line of sight, without appreciably defining or affecting the appearance of the lens. In view of this, the application of the Diffuse Reflecting Form Texture within a Diffuse Reflecting Lens is described relative to a defined major optical area. The major optical area encompasses the majority of the Diffuse Reflecting Lens that is used for viewing purposes. The major optical area applies to the first surface of the first lens element and is used to describe the portion of the first surface that, at a minimum, is comprised of the Diffuse Reflecting Form Texture within a Diffuse Reflecting Lens.

The size and shape of the major optical area within a Diffuse Reflecting Lens is dependant on the size and shape of the particular Diffuse Reflecting Lens whether it be an uncut Diffuse Reflecting Lens or a Diffuse Reflecting Lens that has been cut down to a desired shape and size. As defined herein, the perimeter of a Diffuse Reflecting Lens has edge points located at all points along its perimeter. The major optical area of the first surface within a Diffuse Reflecting Lens is, as defined herein, the entire surface area of the first surface of the first lens element excluding all portions of the first surface within six millimeters of any nearest edge point along the perimeter of the Diffuse Reflecting Lens.

Figure 13A:
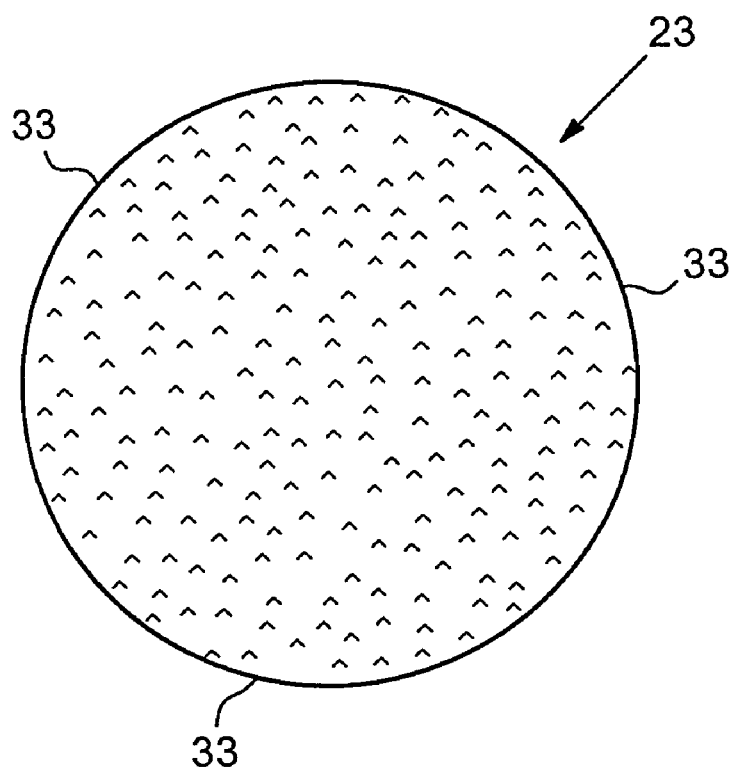
FIG. 13A is a pictorial diagram illustrating a perimeter of the uncut lens of FIG. 1.
Figure 17:
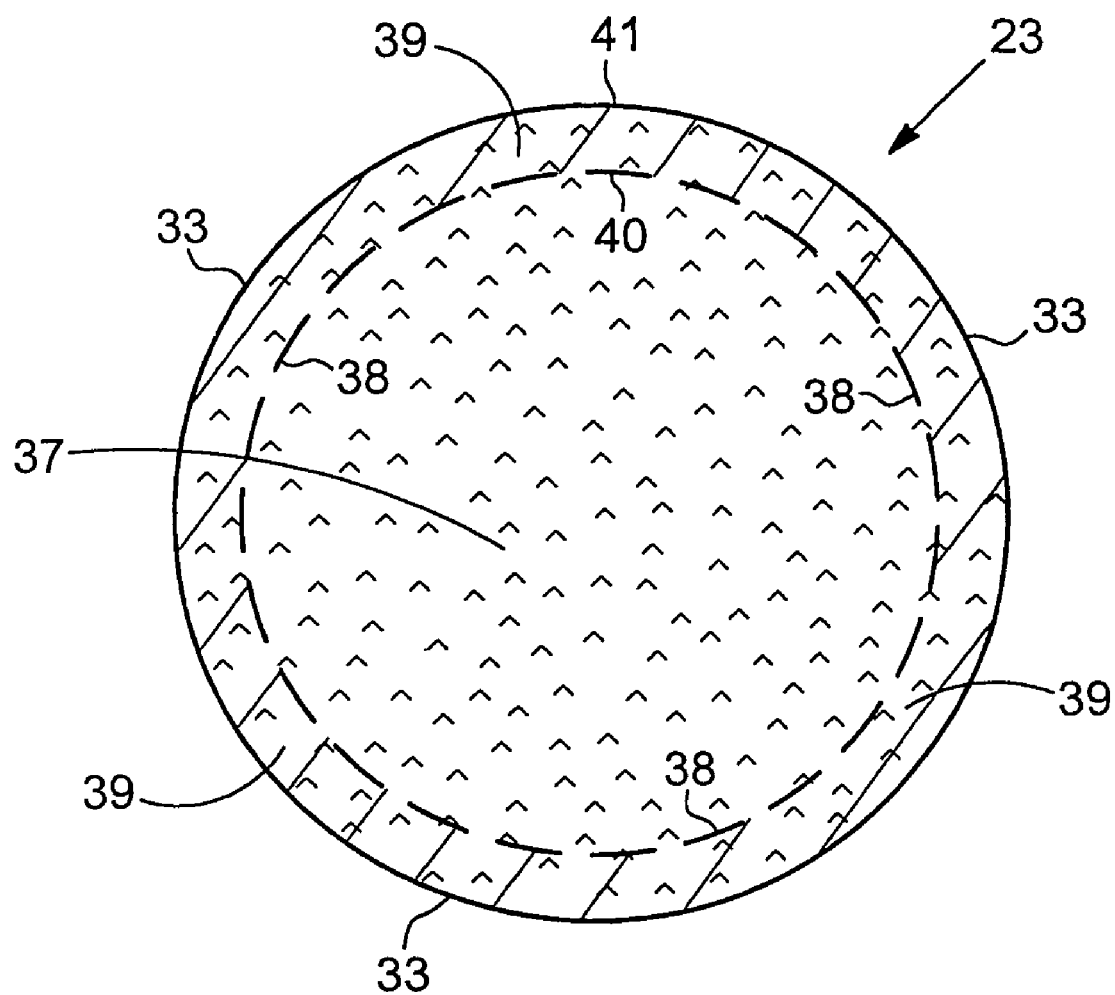
FIG. 17 is a front plan view of the uncut lens of FIG. 1 illustrating a major optical area thereof.

FIG. 17 illustrates the major optical area 37 of the uncut Diffuse Reflecting Lens 23 of FIG. 13A. The uncut Diffuse Reflecting Lens 23 of FIG. 17 is shown in plan view from the front side. Dashed line 38 of FIG. 17 outlines area 37 of FIG. 17 within perimeter 33. Crosshatched area 39 of FIG. 17 represents the portion of the first surface outside of major optical area 37. Major optical area 37 of FIG. 17 is the entire surface area of the first surface excluding all portions of the first surface within six millimeters of any nearest edge point along perimeter 33. For example, point 40 of FIG. 17 represents a single point along dashed line 38, and point 41 of FIG. 17 represents the nearest edge point along perimeter 33 to point 40. The distance between point 40 and 41 is six millimeters.

Figure 18:
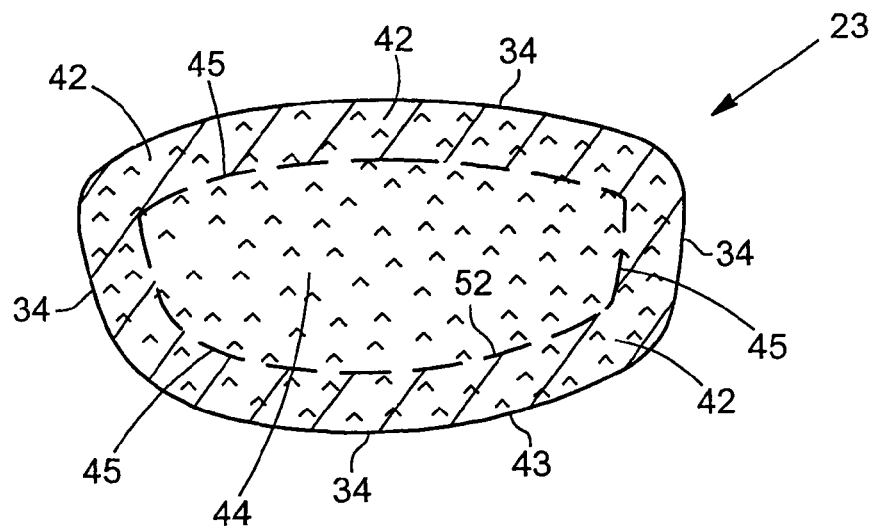
FIG. 18 is a front plan view of the lens of FIG. 13B illustrating a major optical area thereof.

FIG. 18 illustrates the major optical area 44 of the cut down Diffuse Reflecting Lens 23 of FIG. 13B. Diffuse Reflecting Lens 23 of FIG. 18 is shown in plan view from the front side. Dashed line 45 of FIG. 18 outlines area 44 of FIG. 18 within perimeter 34. Crosshatched area 42 of FIG. 18 is the portion of the first surface outside of major optical area 44. Major optical area 44 of FIG. 18 is the entire surface area of the first surface, excluding all portions of the first surface within six millimeters of any nearest edge point along perimeter 34. For example, point 52 of FIG. 18 represents a single point along dashed line 45, and point 43 FIG. 18 represents the nearest edge point along perimeter 34 to point 52. The distance between point 52 and 43 is six millimeters.

Figure 19:
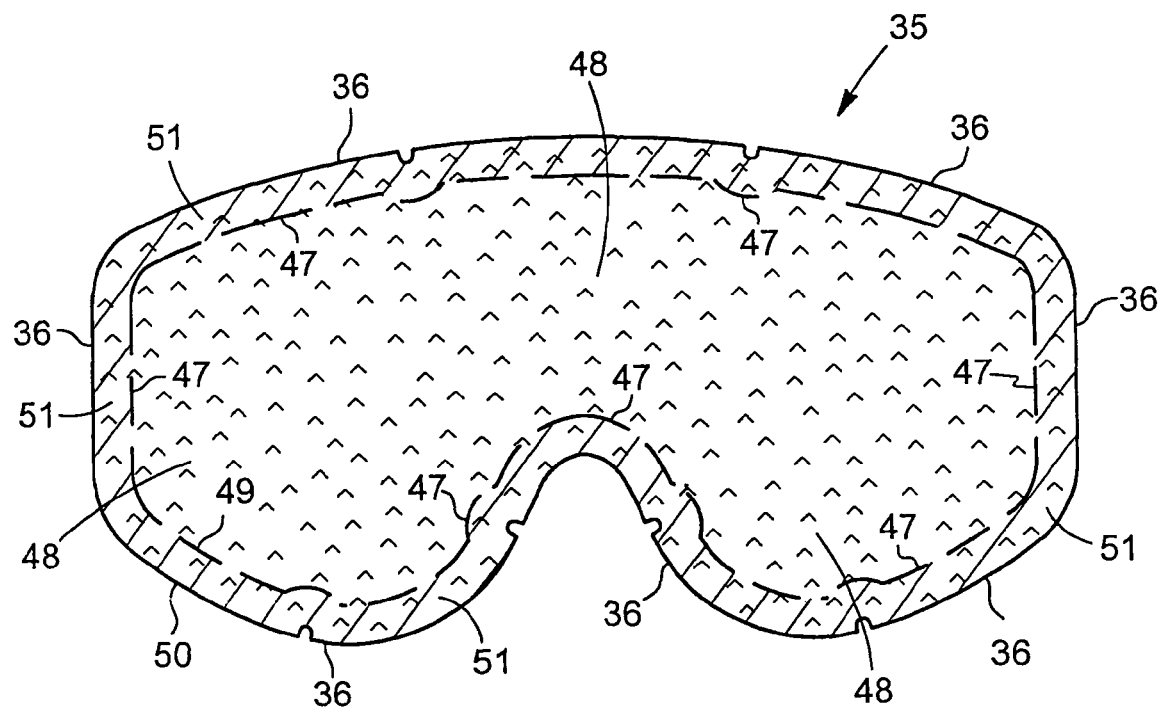
FIG. 19 is a front plan view of the unitary lens of FIG. 15 illustrating a major optical area thereof.

FIG. 19 illustrates the major optical area 48 of the cut down Diffuse Reflecting Lens 35 of FIG. 15. Diffuse Reflecting Lens 35 of FIG. 19 is shown in plan view from the front side. Dashed line 47 of FIG. 19 outlines area 48 of FIG. 19 within perimeter 36. Crosshatched area 51 of FIG. 19 is the portion of the first surface outside of major optical area 48. Major optical area 48 of FIG. 19 is the entire surface area of the first surface, excluding all portions of the first surface within six millimeters of any nearest edge point along perimeter 36. For example, point 49 FIG. 19 represents a single point along dashed line 47, and point 50 of FIG. 19 represents the nearest edge point along perimeter 36 to point 49. The distance between point 49 and 50 is six millimeters.

No less than the entire surface area of the first surface within the major optical area of an uncut Diffuse Reflecting Lens, or a Diffuse Reflecting Lens that has been cut down to a desired shape and size, is comprised of the Diffuse Reflecting Form Texture.

I claim:

1. A uniform diffuse omni-directional reflecting lens comprising:
    a first light transmitting lens element having first and second surfaces, said first surface having a major optical area, said first surface within said major optical area comprising a diffuse reflecting form texture, said diffuse reflecting form texture having a surface finish, said surface finish comprising a random and continuous series of peaks and valleys, said peaks and valleys having a slope angle (Rdq) greater than 0.75 degrees and less than 6.5 degrees, an amplitude (Rq) greater than 5.9 micro-inches and less than 25.0 micro-inches, and a peak density (RSm) greater than 0.0009 inches and less than 0.007 inches;
    a reflective medium applied to at least a portion of said diffuse reflecting form texture, said reflective medium being sufficiently thin to reflect only a fraction of the light impinging thereon, the remainder of the impinging light passing through said reflective medium, said reflective medium applied to said diffuse reflecting form texture representing a prepared first surface of said first light transmitting lens element;
    a light transmitting adhesive layer applied to said prepared first surface, said light transmitting adhesive layer having fifth and sixth surfaces, said fifth surface of said light transmitting adhesive layer conforming to said prepared first surface of said first light transmitting lens element; and
    a second light transmitting lens element having third and fourth surfaces, said fourth surface of said second light transmitting lens element being in contact with said sixth surface of said light transmitting adhesive layer;
    said second surface of said first light transmitting lens element and said third surface of said second light transmitting lens element forming outer surfaces of said diffuse reflecting lens.

2. A uniform diffuse omni-directional reflecting lens as in claim 1, said second surface forming a front surface and said third surface forming a back surface.

3. A uniform diffuse omni-directional reflecting lens as in claim 2, said reflective medium being applied to an entire surface area of said diffuse reflecting form texture.

4. A uniform diffuse omni-directional reflecting lens as in claim 3, further comprising an anti-reflective coating applied to said front surface.

5. A uniform diffuse omni-directional reflecting lens as in claim 3, further comprising a scratch resistant coating applied to said front surface and an anti-reflective coating applied to said scratch resistant coating.

6. A uniform diffuse omni-directional reflecting lens as in claim 2, an entire surface area of said first surface comprising said diffuse reflecting form texture.

7. A uniform diffuse omni-directional reflecting lens as in claim 6, further comprising an anti-reflective coating applied to said front surface.

8. A uniform diffuse omni-directional reflecting lens as in claim 6, further comprising a scratch resistant coating applied to said front surface and an anti-reflective coating applied to said scratch resistant coating.

9. A uniform diffuse omni-directional reflecting lens as in claim 2, an entire surface area of said first surface comprising said diffuse reflecting form texture and said reflective medium being applied to an entire surface area of said diffuse reflecting form texture.

10. A uniform diffuse omni-directional reflecting lens as in claim 9, further comprising an anti-reflective coating applied to said front surface.

11. A uniform diffuse omni-directional reflecting lens as in claim 9, further comprising a scratch resistant coating applied to said front surface and an anti-reflective coating applied to said scratch resistant coating.

12. A uniform diffuse omni-directional reflecting lens as in claim 2, further comprising a polarized film encapsulated within said light transmitting adhesive layer.

13. A uniform diffuse omni-directional reflecting lens as in claim 12, further comprising an anti-reflective coating applied to said front surface.

14. A uniform diffuse omni-directional reflecting lens as in claim 12, further comprising a scratch resistant coating applied to said front surface and an anti-reflective coating applied to said scratch resistant coating.

15. A uniform diffuse omni-directional reflecting lens as in claim 2, further comprising an anti-reflective coating applied to said front surface.

16. A uniform diffuse omni-directional reflecting lens as in claim 2, further comprising a scratch resistant coating applied to said front surface and an anti-reflective coating applied to said scratch resistant coating.

17. A uniform diffuse omni-directional reflecting lens as in claim 1, said third surface forming a front surface and said second surface forming a back surface.

18. A uniform diffuse omni-directional reflecting lens as in claim 17, said reflective medium being applied to an entire surface area of said diffuse reflecting form texture.

19. A uniform diffuse omni-directional reflecting lens as in claim 18, further comprising an anti-reflective coating applied to said front surface.

20. A uniform diffuse omni-directional reflecting lens as in claim 17, an entire surface area of said first surface comprising said diffuse reflecting form texture.

21. A uniform diffuse omni-directional reflecting lens as in claim 20, further comprising an anti-reflective coating applied to said front surface.

22. A uniform diffuse omni-directional reflecting lens as in claim 17, an entire surface area of said first surface comprising said diffuse reflecting form texture and said reflective medium being applied to an entire surface area of said diffuse reflecting form texture.

23. A uniform diffuse omni-directional reflecting lens as in claim 22, further comprising an anti-reflective coating applied to said front surface.

24. A uniform diffuse omni-directional reflecting lens as in claim 22, further comprising a scratch resistant coating applied to said front surface and an anti-reflective coating applied to said scratch resistant coating.

25. A uniform diffuse omni-directional reflecting lens as in claim 17, further comprising an anti-reflective coating applied to said front surface.

* * * * *